United States Patent
Kim et al.

(10) Patent No.: US 8,631,328 B2
(45) Date of Patent: Jan. 14, 2014

(54) SYSTEM AND METHOD FOR CONTROLLING INTERACTION BETWEEN A MOBILE TERMINAL AND A DIGITAL PICTURE FRAME

(75) Inventors: Tae Hyun Kim, Seoul (KR); Lan Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 429 days.

(21) Appl. No.: 12/874,926

(22) Filed: Sep. 2, 2010

(65) Prior Publication Data

US 2011/0055774 A1 Mar. 3, 2011

(30) Foreign Application Priority Data

Sep. 2, 2009 (KR) ........................ 10-2009-0082457

(51) Int. Cl.
   *G06F 3/00* (2006.01)
(52) U.S. Cl.
   USPC ........... 715/732; 715/706; 715/711; 715/715; 715/731; 715/792; 715/802; 715/808; 715/863
(58) Field of Classification Search
   USPC ......... 715/863, 706, 711, 715, 731, 732, 792, 715/802, 808
   See application file for complete search history.

(56) References Cited

U.S. PATENT DOCUMENTS

| | | | | |
|---|---|---|---|---|
| 7,542,720 B2* | 6/2009 | Yoda et al. | ..................... | 455/41.1 |
| 2007/0226734 A1* | 9/2007 | Lin et al. | ....................... | 717/177 |
| 2008/0165290 A1* | 7/2008 | Li et al. | .......................... | 348/739 |
| 2008/0250150 A1* | 10/2008 | Chang | ........................... | 709/229 |
| 2008/0278743 A1* | 11/2008 | Hardy et al. | .................. | 358/1.15 |
| 2009/0150592 A1* | 6/2009 | Kuo et al. | ...................... | 711/100 |
| 2009/0160541 A1* | 6/2009 | Liu et al. | ........................ | 327/544 |
| 2009/0171970 A1* | 7/2009 | Keefe | ............................... | 707/10 |
| 2009/0172124 A1* | 7/2009 | Liu | ............................... | 709/207 |
| 2009/0175133 A1* | 7/2009 | Jiang | .............................. | 368/30 |
| 2009/0182800 A1* | 7/2009 | Lin et al. | ....................... | 709/201 |
| 2009/0216631 A1* | 8/2009 | Ahn | ................................ | 705/14 |
| 2009/0235206 A1* | 9/2009 | Hsu | ............................... | 715/836 |
| 2009/0282173 A1* | 11/2009 | Cheng | ............................... | 710/8 |
| 2009/0295991 A1* | 12/2009 | Stafford et al. | ............... | 348/500 |
| 2009/0318194 A1* | 12/2009 | Alberth et al. | ................ | 455/566 |
| 2010/0017301 A1* | 1/2010 | Alva | ............................... | 705/26 |
| 2010/0042642 A1* | 2/2010 | Shahraray et al. | ............. | 707/102 |

(Continued)

FOREIGN PATENT DOCUMENTS

CN 101183292 5/2008
CN 101404681 4/2009

OTHER PUBLICATIONS

Bing search q=adjust+brightness+digital30 picture+ Aug. 22, 2013.*
Bing search q=digital+picture+frame+cell+phone&q Aug. 22, 2013.*

*Primary Examiner* — Boris Pesin
*Assistant Examiner* — John Heffington
(74) *Attorney, Agent, or Firm* — KED & Associates LLP

(57) ABSTRACT

A mobile terminal includes a wireless communication unit, a memory, a touch screen, and a controller. The wireless communication unit establishes a connection to an external digital picture frame. The memory stores a plurality of images including one or more characters and information mapped to the characters. The touch screen displays a first image stored in the memory. And, the controller transmits the first image and first information mapped to the first image to the digital picture frame via the wireless communication unit.

3 Claims, 44 Drawing Sheets

(56) References Cited

U.S. PATENT DOCUMENTS

| | | | |
|---|---|---|---|
| 2010/0088366 A1* | 4/2010 | Li et al. | 709/203 |
| 2010/0136943 A1* | 6/2010 | Hirvela et al. | 455/404.1 |
| 2010/0138365 A1* | 6/2010 | Hirvela et al. | 706/12 |
| 2010/0167646 A1* | 7/2010 | Alameh et al. | 455/41.2 |
| 2010/0171805 A1* | 7/2010 | Ron et al. | 348/14.02 |
| 2010/0174801 A1* | 7/2010 | Tabaaloute | 709/217 |
| 2010/0184372 A1* | 7/2010 | Tabaaloute | 455/41.1 |
| 2010/0215034 A1* | 8/2010 | Klein et al. | 370/352 |
| 2010/0234074 A1* | 9/2010 | Keski-Jaskari | 455/566 |
| 2010/0254631 A1* | 10/2010 | Chien et al. | 382/305 |
| 2010/0293105 A1* | 11/2010 | Blinn et al. | 705/319 |
| 2010/0325233 A1* | 12/2010 | Sasaki et al. | 709/206 |
| 2011/0018793 A1* | 1/2011 | Chen et al. | 345/156 |
| 2011/0050564 A1* | 3/2011 | Alberth et al. | 345/156 |
| 2011/0199295 A1* | 8/2011 | Chen et al. | 345/156 |
| 2012/0021682 A1* | 1/2012 | Tabaaloute | 455/41.1 |
| 2012/0064922 A1* | 3/2012 | Podoloff et al. | 455/456.6 |
| 2012/0198504 A1* | 8/2012 | Tabaaloute | 725/81 |
| 2012/0204208 A1* | 8/2012 | Ahn | 725/32 |
| 2012/0209703 A1* | 8/2012 | Ahn | 705/14.51 |
| 2012/0311438 A1* | 12/2012 | Cranfill et al. | 715/256 |

* cited by examiner

SYSTEM AND METHOD FOR CONTROLLING INTERACTION BETWEEN A MOBILE TERMINAL AND A DIGITAL PICTURE FRAME

CROSS-REFERENCE TO RELATED APPLICATION

This application claims benefit of Korean Patent Application No. 10-2009-0082457, filed on Sep. 2, 2009, which is incorporated herein by reference.

BACKGROUND

1. Field

One or more embodiments described herein relate to managing information for one or more of electronic devices.

2. Background

Modern mobile terminals perform many functions in addition to voice and data communications. These functions include capturing images and video using a camera, recording audio, and playing music files and games. As these and other functions become more prevalent, improvements are needed to better manage and output information to users.

DETAILED DESCRIPTION

Figure 1:
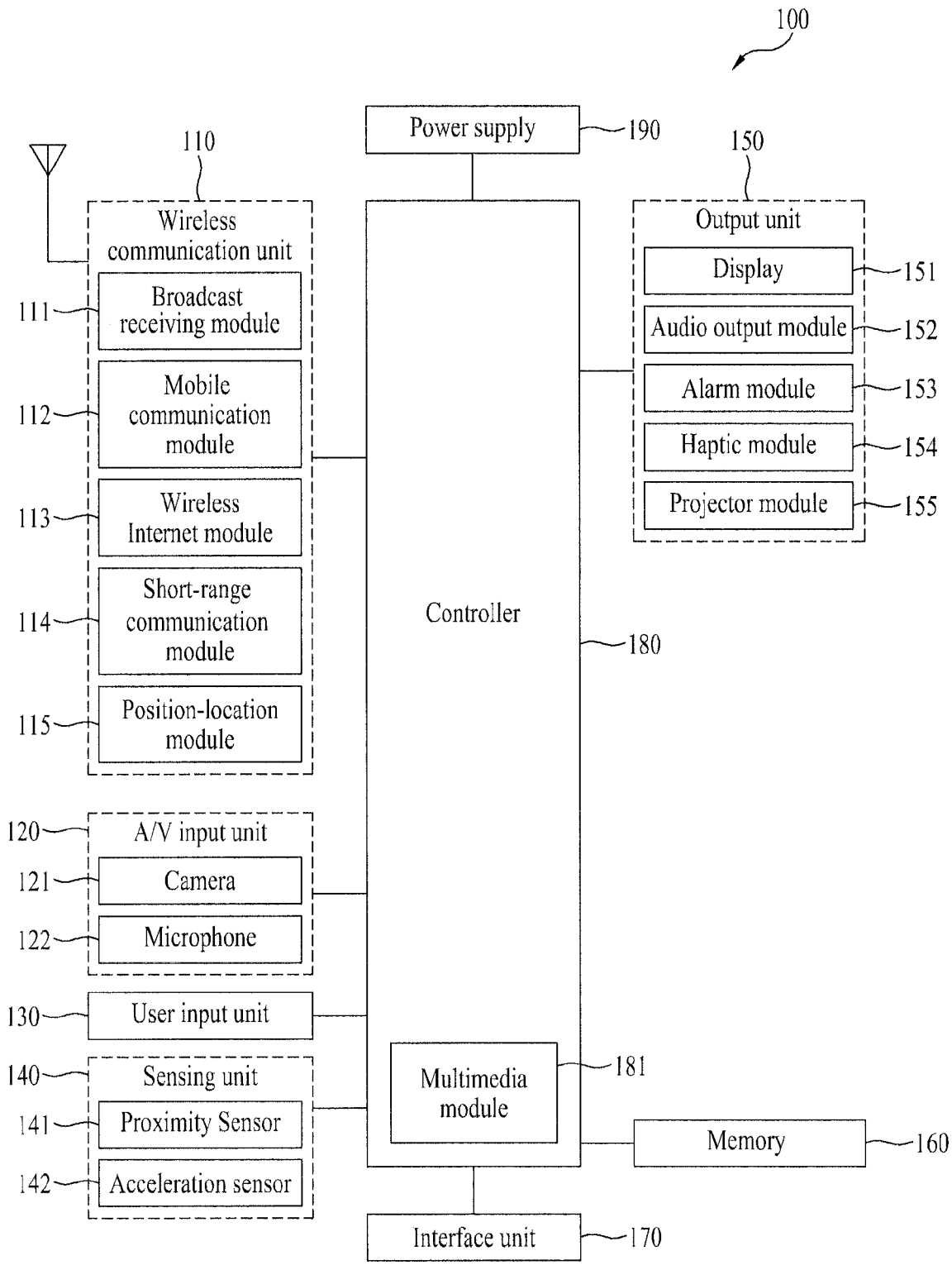
FIG. 1 is a diagram of one embodiment of a mobile terminal.

FIG. 1 shows one embodiment of a mobile terminal 100 which includes a wireless communication unit 110, an A/V (audio/video) input unit 120, a user input unit 130, a sensing unit 140, an output unit 150, a memory 160, an interface unit 170, a controller 180, and a power supply unit 190. In other embodiments, the terminal may have more or fewer components.

The wireless communication unit 110 may include one or more components for establishing wireless communication between the mobile terminal 100 and a wireless communication system or network within which the mobile terminal 100 is included. For instance, the wireless communication unit 110 can include a broadcast receiving module 111, a mobile communication module 112, a wireless internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel.

The broadcast managing server may be a server which generates and transmits a broadcast signal and/or broadcast associated information, or a server provided with a previously generated broadcast signal and/or broadcast associated information. The server may then transmit the provided signal or information to a terminal. The broadcast signal may be, for example, a TV broadcast signal, radio broadcast signal, data broadcast signal, or another type of signal. If desired, the broadcast signal may further include a broadcast signal combined with a TV or radio broadcast signal.

At least two broadcast receiving modules 111 can be provided to the mobile terminal 100 in pursuit of simultaneous reception of two or more broadcast channels or broadcast channel switching facilitation.

The broadcast associated information includes information associated with one or more of a broadcast channel, broadcast program, or broadcast service provider. The broadcast-associated information can be provided via a mobile communication network, and in this case the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may include, for example, audio, video and data signals including text and/or multimedia messages.

The mobile communication module 112 may be configured to communicate with a digital picture frame 200. Under control of controller 180, the mobile communication module 112 may transmit various types of data and other information from the mobile terminal 100 to the digital picture frame 200 using this module. For example, the mobile communication module 112 may transmit all picture information displayed on display module 151 to the digital picture frame 200 and may also transmit audio information output from the audio output module 152 to the digital picture frame 200.

The wireless internet module 113 may support Internet access for the mobile terminal 100. Moreover, this module may be internally or externally coupled to the mobile terminal 100. In this case, the wireless Internet technology can include, for example, one or more of WLAN (Wireless LAN) (Wi-Fi), Wibro (Wireless broadband), Wimax (World Interoperability for Microwave Access), or HSDPA (High Speed Downlink Packet Access).

A communication connection may be established between the wireless internet module 113 and the digital picture frame 200. The wireless internet module 113 may transmit various types of data and other information from the mobile terminal 100 to the digital picture frame 200 under the control of controller 180 through this connection.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Moreover, a communication connection may be established between the short-range communication module 114 and the digital picture frame 200. The short-range communication module 114 may transmit data and other information from the mobile terminal 100 to the digital picture frame 200 under the control of the controller 180 through this connection.

The position-location module 115 identifies or otherwise obtains the location of the mobile terminal 100. If desired, this module may be implemented with a global positioning system (GPS) module.

The audio/video (A/V) input unit 120 is configured to provide audio or video signal input to the mobile terminal 100. As shown, the A/V input unit 120 includes a camera 121 and a microphone 122.

The camera 121 possesses a digital zoom function and processes image frames of still pictures or video, which may be obtained by an image sensor in a video call mode or a photographing mode. The processed image frames can be displayed on the display 151.

The image frames processed by the camera 121 can be stored in the memory 160 and/or externally transmitted via the wireless communication unit 110. Optionally, at least two cameras 121 can be provided to the mobile terminal 100 according to environment of usage.

The microphone 122 receives an external audio signal while the portable device is in a particular mode such as, for example, phone call mode, recording mode or voice recognition. This audio signal is processed and converted into electronic audio data, and then the processed audio data is transformed into a format transmittable to a mobile communication base station via the mobile communication module 112 in call mode. The microphone 122 may include assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In another variation, the sensing unit 140 may have a proximity sensor 141.

Acceleration sensor 142 detects body motion of the mobile terminal 100 and outputs a signal corresponding to the detected body motion to the controller 180.

Output unit 150 generates output signals related to sensing of sight, hearing, and/or touch, and may include the display 151, audio output module 152, alarm unit 153, haptic module 154, and/or a projector module 155.

Display 151 visually displays (outputs) various types of information associated with the mobile terminal 100. For instance, if the mobile terminal is operating in phone call mode, the display may serve as a user interface (UI) or graphical user interface (GUI) which includes information associated with placing, conducting, and terminating a phone call. As another example, if the mobile terminal 100 is in video call mode or photographing mode, the display 151 may additionally or alternatively display images associated with these modes, the UI or the GUI.

The display module 151 may be implemented using any of a variety of known display technologies including, for example, a liquid crystal display (LCD), a thin film transistor-liquid crystal display (TFT-LCD), an organic light-emitting diode display (OLED), a flexible display and/or a three-dimensional display. In another embodiment, the mobile terminal 100 may include one or more of such displays.

Some of the above displays may be implemented in a transparent or optical transmissive-type which can be referred to as a transparent display. A representative example of a transparent display includes TOLED (transparent OLED). A rear configuration of the display 151 may be implemented in the optical transmissive-type. In this configuration, a user is able to see an object in rear of a terminal body via the area occupied by the display 151 of the terminal body.

If the mobile terminal includes two or more displays 151, the one embodiment of the terminal contemplates arranging a plurality of displays on a single face of the terminal. The displays may be spaced apart from one other or built into one body. Alternatively, a plurality of displays may be arranged on different faces of the terminal.

In case that the display 151 and a sensor for detecting a touch action (hereinafter called 'touch sensor') is implemented in a mutual-layer structure (hereinafter called 'touchscreen'), display 151 may serve as an input device as well as an output device. In this case, the touch sensor may be configured as a touch film, a touch sheet, or a touchpad.

The touch sensor can be configured to convert a pressure applied to a specific portion of the display 151 or a variation of a capacitance generated from a specific portion of the display 151 to an electric input signal. Moreover, the touch sensor is able to be configured to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

A proximity sensor (not shown) may be provided to an internal area of the mobile terminal 100 enclosed by the touchscreen or around the touchscreen. The proximity sensor is the sensor that detects a presence or absence of an object approaching a prescribed detecting surface or an object existing around the proximity sensor using, for example, an electromagnetic field strength or infrared ray without mechanical contact. Hence, the proximity sensor has durability longer than that of a contact type sensor and also has utility wider than that of the contact type sensor.

The proximity sensor can include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, or an infrared proximity sensor. In case that the touchscreen includes the electrostatic capacity proximity sensor, it may be configured to detect the proximity of a pointer using a variation of electric field according to the proximity of the pointer. In this case, the touchscreen (touch sensor) can be classified as the proximity sensor.

In the following description, a "proximity touch" will be understood to include the detection of a pointer which approaches a touchscreen at a particular location without contacting the touchscreen. The position on the touchscreen proximity-touched by the pointer will be understood to correspond to the position of the pointer at a location that vertically opposes the touchscreen. On the other hand, an action where a pointer actually touches the touchscreen will be referred to as a "contact touch."

The proximity sensor may detect a proximity touch and proximity touch pattern, e.g., a proximity touch distance, proximity touch duration, proximity touch position, and/or proximity touch shift state. Information corresponding to the detected proximity touch action and the detected proximity touch pattern may be output to the touchscreen.

The audio output module 152 may function in various modes including a call-receiving mode, call-placing mode, recording mode, voice recognition mode, and/or broadcast reception mode. In the audio output mode, audio data is output as received from the wireless communication unit 110 or is stored in the memory 160. In operation, the audio output module 152 may output audio relating to a particular function (e.g., call received, message received, etc.). The audio output module 152 may be implemented using one or more speakers, buzzers, other audio producing devices, or a combination thereof.

The alarm unit 153 is output a signal for announcing the occurrence of a particular event associated with the mobile terminal 100. Examples of events include a call received event, a message received event, and a touch input received event. The alarm unit 153 may output a signal for announcing the event occurrence, for example, by way of a vibration, video and/or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to a skim over a skin surface, an effect attributed to contact with an electrode, an effect attributed to electrostatic force, an effect attributed to representation of hot and/or cold using an endothermic or exothermic sensing device.

The haptic module 154 can be implemented to enable a user to sense the tactile effect through a muscle sense of a finger or arm, as well as to transfer the tactile effect through direct contact. Multiple haptic modules 154 can be provided to the mobile terminal 100 if desired.

The projector module 155 is an element for performing an image projector function using the mobile terminal 100. The projector module 155 may display an image, which is identical to or partially different at least from the image displayed on the display 151, on an external screen or wall according to a control signal of the controller 180.

In particular, the projector module 155 can include a light source (not shown) generating light (e.g., laser) for projecting an image externally, an image producing unit (not shown) for producing an image to be output externally using light generated from the light source, and a lens (not shown) for enlarging the image to be externally output at a predetermined focus distance. The projector module 155 may further include a device (not shown) for adjusting an image projected direction by mechanically moving the lens or the whole module.

The projector module 155 may be implemented using a CRT (cathode ray tube) module, an LCD (liquid crystal display) module, a DLP (digital light processing) module or another display device technology. The DLP module may be operated based on use of a mechanism which enables light generated from a light source to be reflected from a DMD (digital micro-mirror device) chip, and can be advantageous for downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module may include a chip for storing various kinds of information for authenticating use authority of the mobile terminal 100 and can include, for example, User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 may supply the mobile terminal 100 with power from the cradle or may deliver various command signals input from the cradle by a user to the mobile terminal 100. The signals inputted from the cradle or the power can operate as a signal enabling the mobile terminal 100 to recognize that it is correctly loaded in the cradle.

The controller 180 may controls the overall operations of the mobile terminal 100. For example, the controller 180 may perform the control and processing associated with voice calls, data communications, video calls, as well as types of communications and functions. In addition, the controller 180 may include a multimedia module 181 that provides multimedia playback. The multimedia module 181 may be configured as part of the controller 180, or implemented as a separate component.

The controller 180 may also perform a pattern recognizing process for recognizing a writing input and a picture drawing input carried out on the touchscreen as characters or images, respectively.

The power supply unit 190 provides power required by the various components of the mobile terminal 100. The power may be internal power, external power, or a combination thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules such as procedures and functions, each of which performs one or more of the functions and operations described herein. The software codes may be implemented with a software application written in any suitable programming language and may be stored in memory such as the memory 160, and executed by a controller or processor, such as the controller 180.

Figure 2:
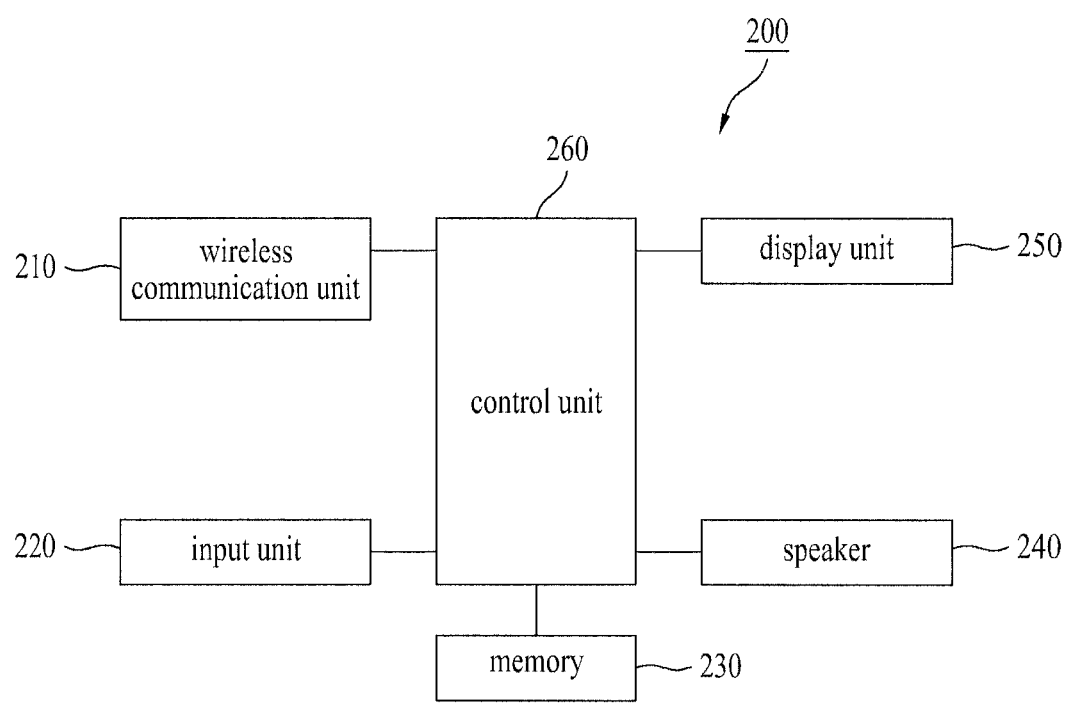
FIG. 2 is a diagram of one type of digital picture frame that may be generated in accordance with one or more embodiments described herein.

FIG. 2 shows one embodiment of a digital picture frame which includes a wireless communication unit 210, an input unit 220, a memory 230, a speaker 240, a display unit 240 and a control unit 260. The digital picture frame 200 may include a number of additional components (e.g., camera, interface, etc.), for example, such as those found on mobile terminal 100.

The wireless communication unit 210 establishes communication with the mobile terminal 100 under control of the control unit 270. Once this communication is established, the wireless communication unit 210 may receive picture information displayed in the mobile terminal 100 as well as audio information and key input information from the mobile terminal 100.

The wireless communication unit 210 may include a mobile communication module, a wireless internet module and/or a short-range communication module which enables communication between the mobile terminal 100 and the digital picture frame 200, for example, in a manner similar to wireless communication unit 110 of the mobile terminal 100 shown in FIG. 1.

The input unit 220 generates input data responsive to user manipulation of one or more associated input devices. Examples of such devices include a keypad, a dome switch, a touchpad (e.g., static pressure/capacitance), a jog wheel, a jog switch, etc.

Programs for performing operations of the digital picture frame 200 can be stored in the memory 230, and various data such as video files, audio files, and/or image files may also be stored in the memory 230.

The memory 230 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory), or other memory or data storage device.

The speaker 240 outputs audio files stored in the memory 230 and/or various sounds generated from the digital picture frame 200.

The display unit 250 displays information processed by the digital picture frame 200, and may include at least one of a liquid crystal display (LCD), a thin film transistor-liquid crystal display (TFT LCD), an organic light-emitting diode (OLED), a flexible display or a 3D display. In one embodiment, the display unit 250 may be coupled with a touch sensor to construct a touchscreen.

The display unit 250 may be implemented using any of a variety of known display technologies including, for example, a liquid crystal display (LCD), a thin film transistor-liquid crystal display (TFT-LCD), an organic light-emitting diode display (OLED), an TOLED (transparent OLED), a flexible display and/or a three-dimensional display.

The control unit 260 controls overall operations of the digital picture frame 200. These operations include controlling picture information received from the mobile terminal 100 to be displayed on the display unit 250. The control unit 260 may also control a key signal, which is input via the input unit 220, to be transmitted to the mobile terminal 100 via the wireless communication unit 210.

In the following description, embodiments of a process for data transmission and reception between the above configured mobile terminal 100 and the above configured digital picture frame 200 are explained with reference to the accompanying drawings. The embodiments explained in the following description are independently usable or can be combined with each other.

Figure 3:
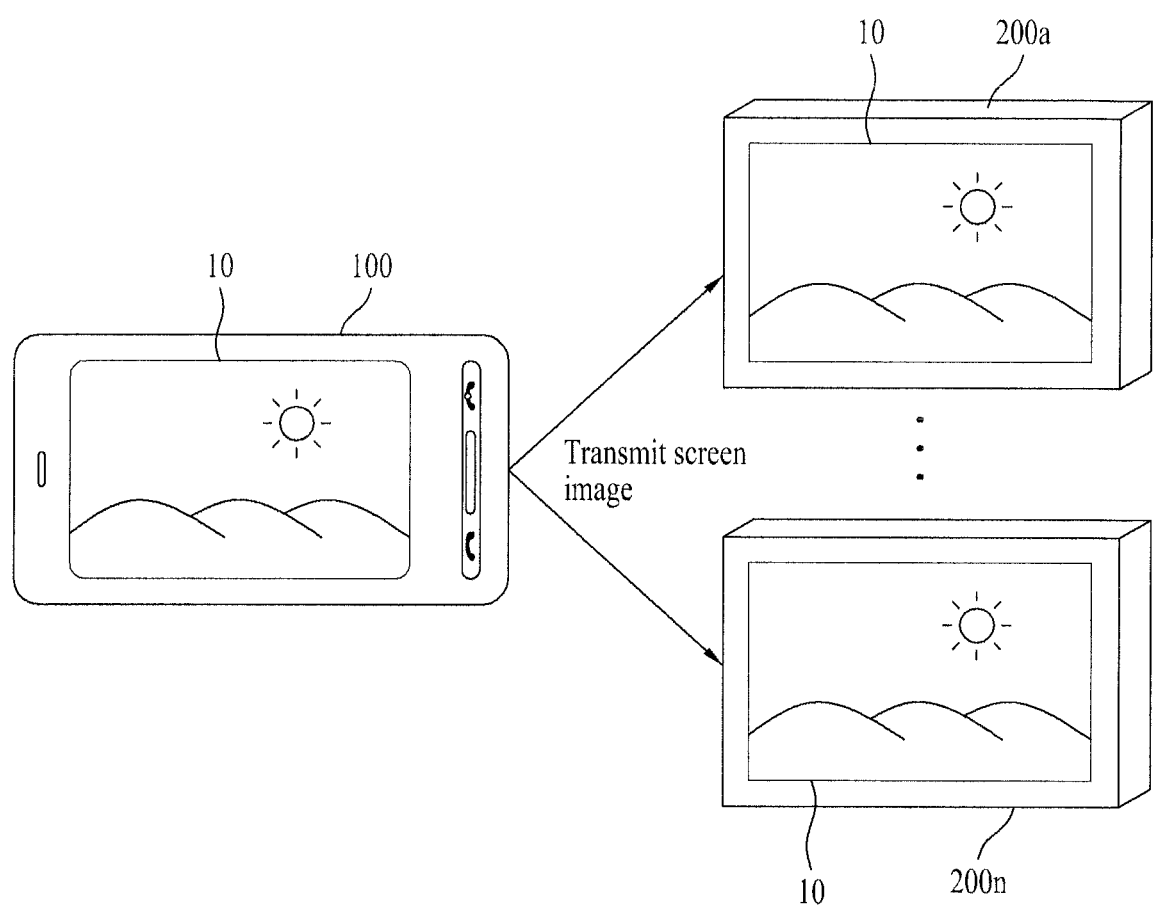
FIG. 3 is a diagram showing one embodiment of a system including a mobile terminal that communications with at least one digital picture frame.

FIG. 3 shows one embodiment of a system which includes a mobile terminal that communicates with at least one digital picture frame. In this system, at least one or more digital picture frames 200a to 200n are located relative to mobile terminal 100, and short-range communication is established between the terminal 100 and the one or more digital picture frames 200a to 200n. Using this short-range communication, mobile terminal 100 is able to transmit an image 10 displayed on a screen of the terminal to the one or more digital picture frames 200a to 200n.

More specifically, after mobile terminal 100 is connected to digital picture frame 200 by a short-range communication link, the mobile terminal 100 is able to transmit the picture information 10 displayed on the display module 151 to the digital picture frame 200. The digital picture frame 200 then displays the picture information 10 received from the mobile terminal 100 on its screen.

In doing so, the digital picture frame 200 displays the picture information 10 in a size similar or equal to that of the image as displayed in the mobile terminal 100 or, alternatively, is able to display picture information 10 in a different or extended size to fit a whole screen of the digital picture frame 200.

First Embodiment

In accordance with a first embodiment, a communication connection is established between mobile terminal 100 and digital picture frame 200 based on a user's touch gesture or body motion as applied to the mobile terminal 100. A process that may be used to set commands based on a touch gesture or body motion as applied to the mobile terminal 100, in order to establish a communication connection with the digital picture frame 200, is explained with reference to FIG. 4 and FIG. 5.

Figure 4:
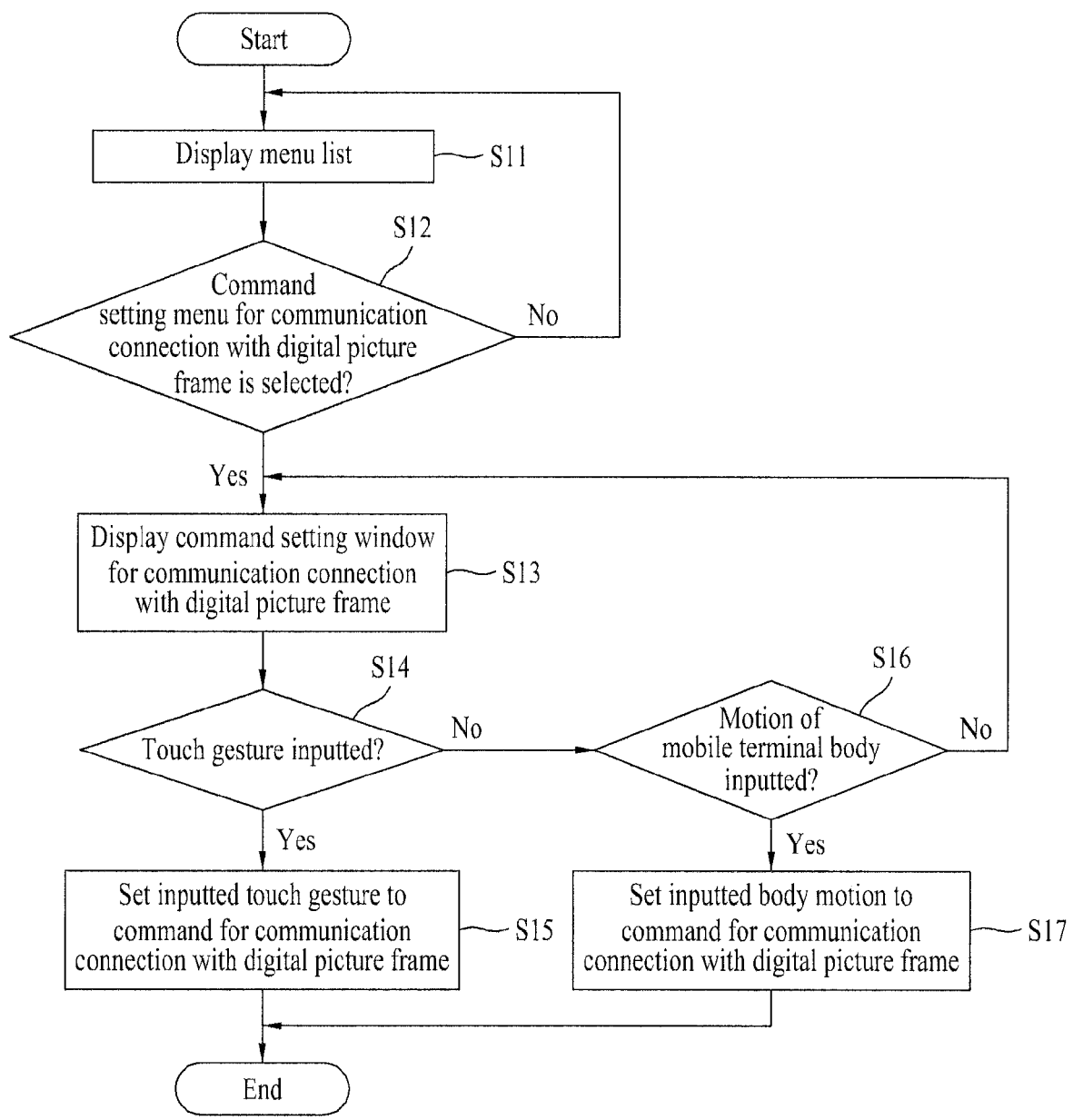
FIG. 4 is a diagram showing steps included in one embodiment of a method for setting a command for establishing a connection between a mobile terminal and a digital picture frame.
Figure 5:
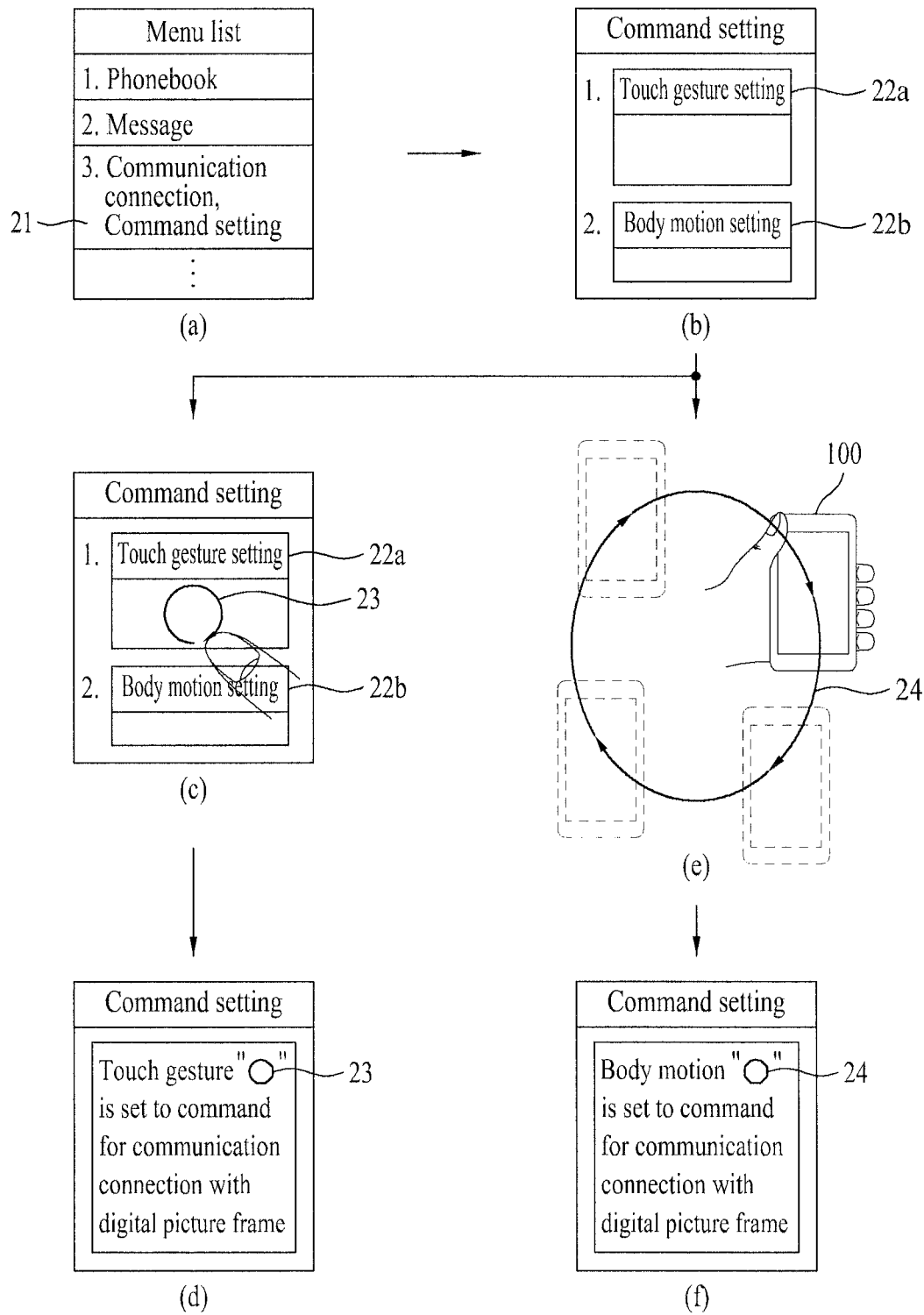
FIGS. 5(a)-5(f) are diagrams showing different ways for setting a command for establishing a connection between a mobile terminal and digital picture frame using, for example, the steps shown in FIG. 4.

More specifically, FIG. 4 shows one embodiment of a method that may be used to establish a communication connection between a mobile terminal and a digital picture frame, and FIG. 5 shows screen configurations that may be used to display a process for a mobile terminal to set a command for establishing a communication connection with the digital picture frame.

Referring to FIG. 4 and FIG. 5, a menu list is displayed on display module 151 of a touchscreen type (S11), hereinafter referred to as a touchscreen. From this menu list, a command setting menu 21 for establishing a communication connection with a digital picture frame may be selected (S12), as shown in FIG. 5 (a). The controller 180 of the mobile terminal 100 may then cause a command setting window to be displayed on the touchscreen 151 (S13), as shown in FIG. 5 (b).

The mobile terminal 100 is then able to set a command for establishing the communication connection with the digital picture frame 200 in two possible ways. The first way is based on a user's touch gesture and the second way is based on motion of a body of the mobile terminal 100.

More specifically, as shown in FIG. 5(b), the command setting window may include a touch gesture setting window 22a and a body motion setting window 22b. If the touch gesture setting window 22a is touched by a user, the controller 180 activates the touch gesture setting window 22a and then detects whether a user's touch gesture is inputted to the touch gesture setting window 22a.

If a touch gesture 23 having a specific pattern such as 'O' is input via window 22a by the user (S14) as shown in FIG. 5 (c), controller 180 recognizes the touch gesture 23 having the pattern 'O' as a command for establishing a short-range connection with the digital picture frame 200. The controller then maps touch gesture 23 and the short-range connection operation with the digital picture frame 200 to each other, and then stores it in the memory 160 (S15) as shown in FIG. 5 (d). Touch gesture 23 may correspond to a contact touch or a proximity touch.

Alternatively, if body motion setting window 22b is touched by the user, controller 180 drives the acceleration sensor 142 and then uses this sensor to detect whether a specific motion of the mobile terminal body is input.

If a specific motion 24 of the mobile terminal body is input from the user via acceleration sensor 142 (S16) as shown in FIG. 5 (e), controller 180 recognizes the input motion 24 of the body as a command for establishing a short-range communication connection with the digital picture frame 200. The controller then maps the body motion 24 and short-range communication connection operation of the digital picture frame 200 to each other and then stores it in the memory 160 (S17) as shown in FIG. 5(f).

In the following description, a process for connecting the short range communication with the digital picture frame 200 using the touch gesture or the body motion set in FIG. 4 and FIG. 5 is explained with reference to FIGS. 6 to 8.

Figure 6:
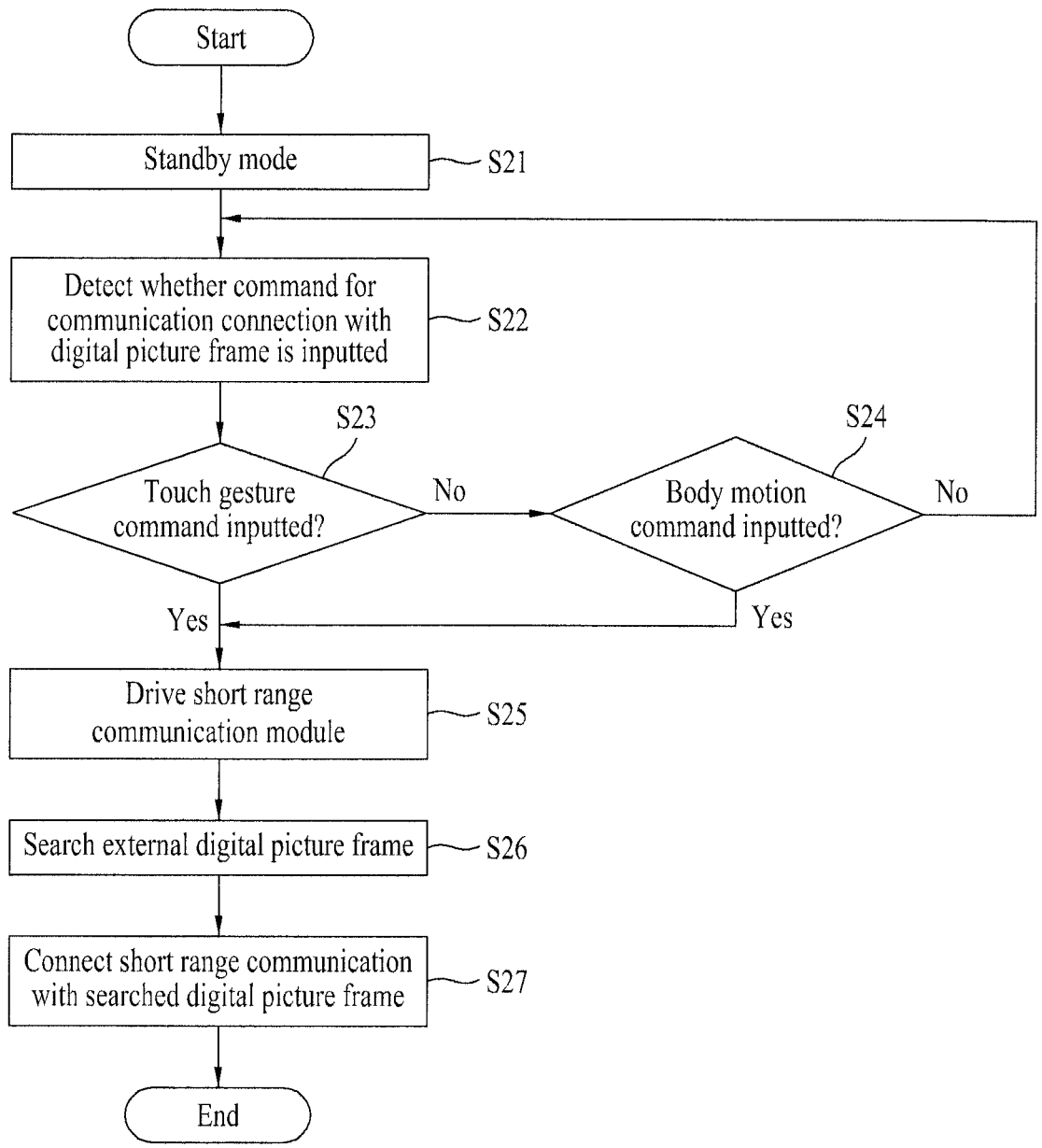
FIG. 6 is a diagram showing steps included in one embodiment of a method for establishing a connection between a mobile terminal and a digital picture frame based on a touch gesture or a body motion.
Figure 7:
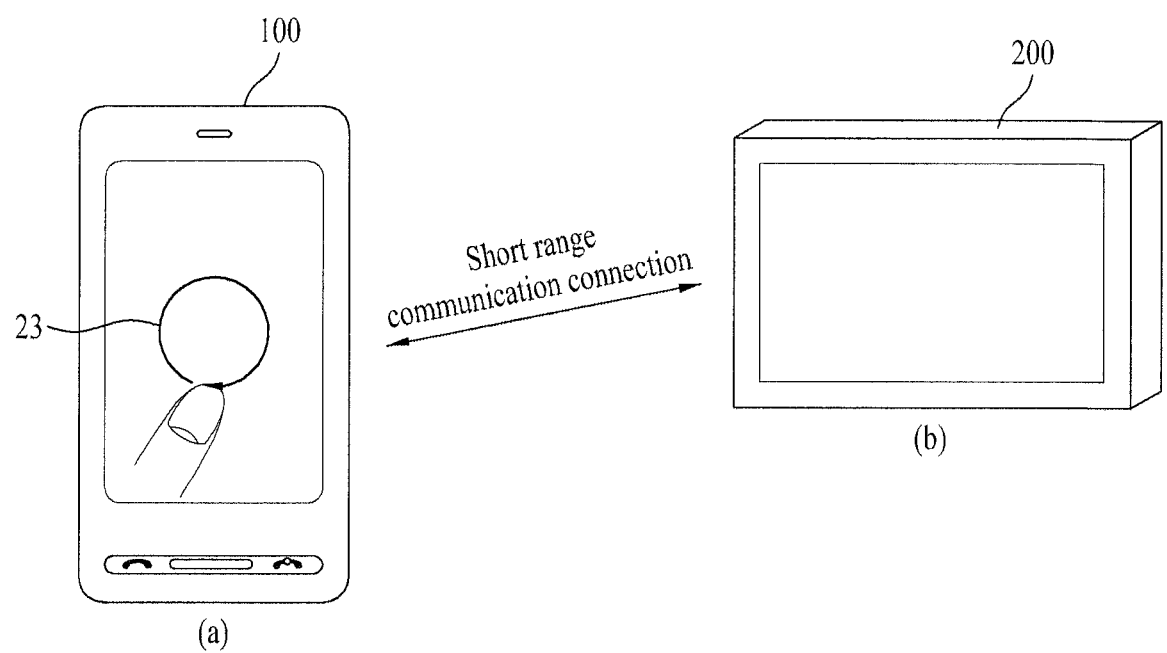
FIGS. 7(a)-7(b) are diagrams showing one type of a screen for establishing a connection between a mobile terminal and digital picture frame based on a set touch gesture.
Figure 8:
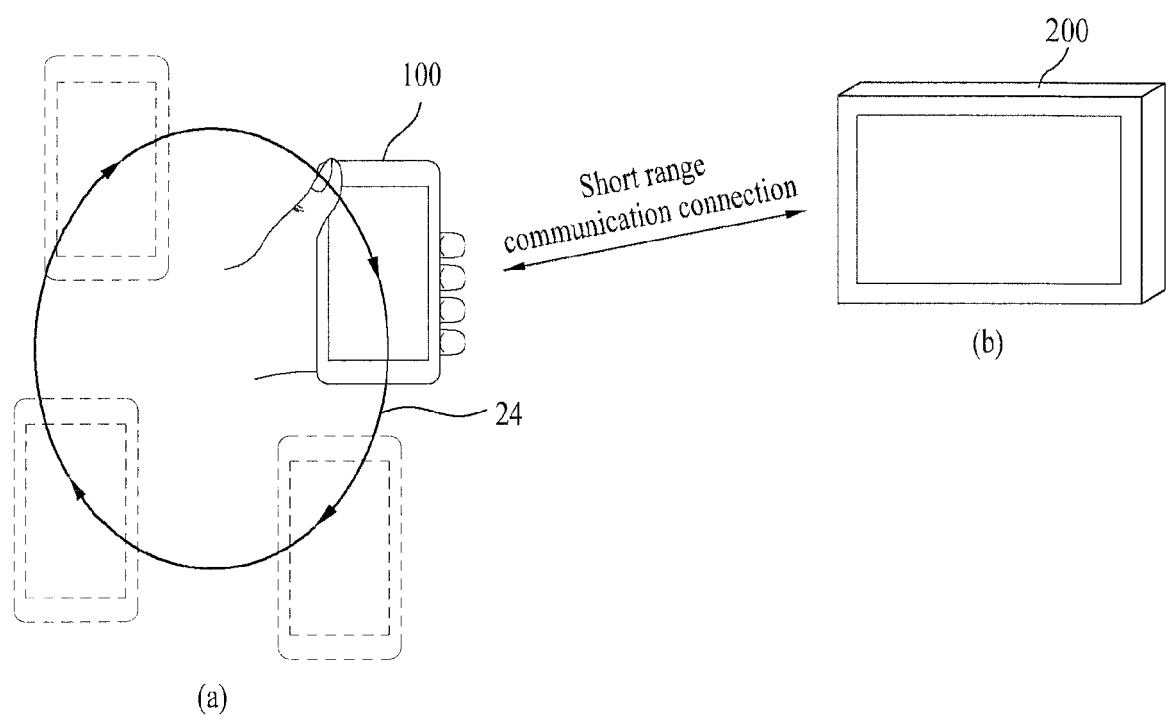
FIG. 8 is a diagram showing one type of screen for establishing a connection between a mobile terminal and a digital picture frame based on a set body motion.

FIG. 6 shows steps included in one embodiment of a method for establishing a communication connection with a digital picture frame based on a touch gesture or a body motion, FIG. 7 shows an example of a screen configuration for displaying a process for establishing a communication connection with a digital picture frame using a touch gesture, and FIG. 8 shows an example of a screen configuration for displaying a process for establishing a communication connection with a digital picture frame using a body motion.

Referring to FIGS. 6 to 8, in standby mode (S21), controller 180 of the mobile terminal 100 detects whether a command for establishing a communication connection with the digital picture frame 200 (as set, for example, in FIGS. 4 and 5) is input (S22).

More specifically, controller 180 detects whether a touch gesture 23 from a user (as defined or set in FIGS. 4 and 5) is input into touchscreen 151 or whether a body motion 24 (as defined or set in FIGS. 4 and 5) is input based on a signal from acceleration sensor 142.

If touch gesture 23 (e.g., a circular motion applied by a finger on the terminal screen) is input into touchscreen 151 (S23) as shown in FIG. 7 or body motion 24 (e.g., a rotational motion of the terminal body) is input as detected by acceleration sensor 142 (S24) as shown in FIG. 8, controller 180 drives short-range communication module 114 (S25) and then searches for a digital picture frame 200 in a vicinity of mobile terminal 100 (S26).

The controller 180 establishes the short-range communication connection with a digital picture frame 200 produced by the search via short-range communication module 114. Picture or other information currently displayed on touchscreen 151 is then transmitted from the mobile terminal to the digital picture frame 200 over the established short-range connection or link (S27).

Second Embodiment

In a second embodiment, picture content displayed in mobile terminal 100 is transmitted for display and/or storage in the digital picture frame 200 based on a user's touch gesture or a body motion. A process for setting commands corresponding to a touch gesture and/or body motion for transmitting picture content from the mobile terminal to the digital picture frame may be performed as follows.

Figure 9:
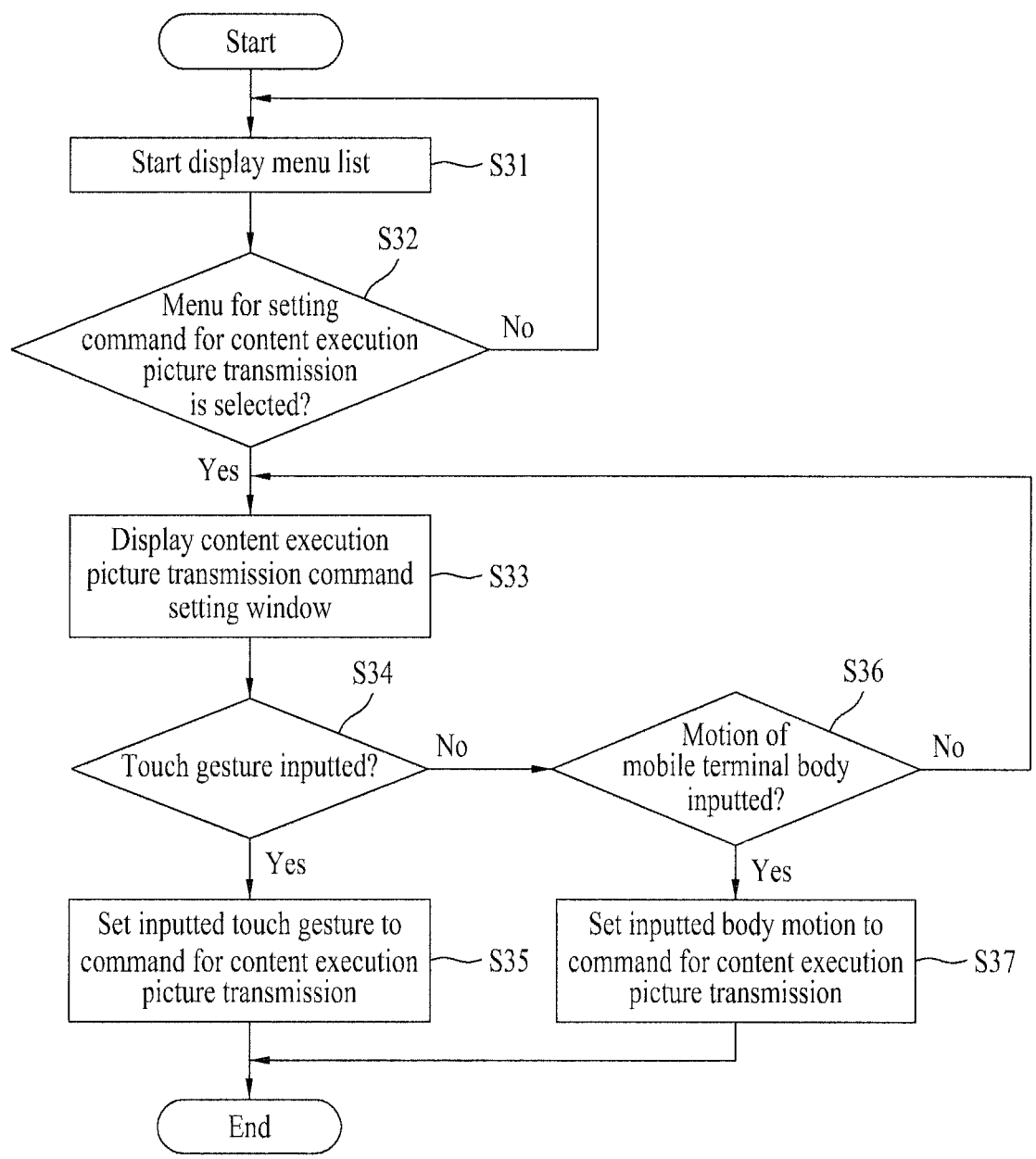
FIG. 9 is a diagram showing steps included in a method for setting a command for transmitting content from a mobile terminal to a digital picture frame.

FIG. 9 shows steps included in one embodiment of a method for setting a command for transmitting picture content from a mobile terminal to a digital picture frame, and FIGS. 10(a)-(f) are diagrams showing examples of screens that may be used for setting a command in accordance with the method of FIG. 9.

Referring to these figures, a menu list is displayed on touchscreen 151 (S31). The menu list includes a command setting menu 31 for transmitting picture information displayed in the mobile terminal 100 to the digital picture frame 200. When menu 31 is selected (S32) as shown in FIG. 10 (a), controller 180 of the mobile terminal 100 enables a command setting window to be displayed on touchscreen 151 (S33) as shown in FIG. 10 (b).

The mobile terminal 100 sets a command for establishing a communication connection with the digital picture frame 200 in two possible ways. One way sets a command based on a user's touch gesture and another way sets a command based on a motion of a body of the mobile terminal 100.

Figure 10:
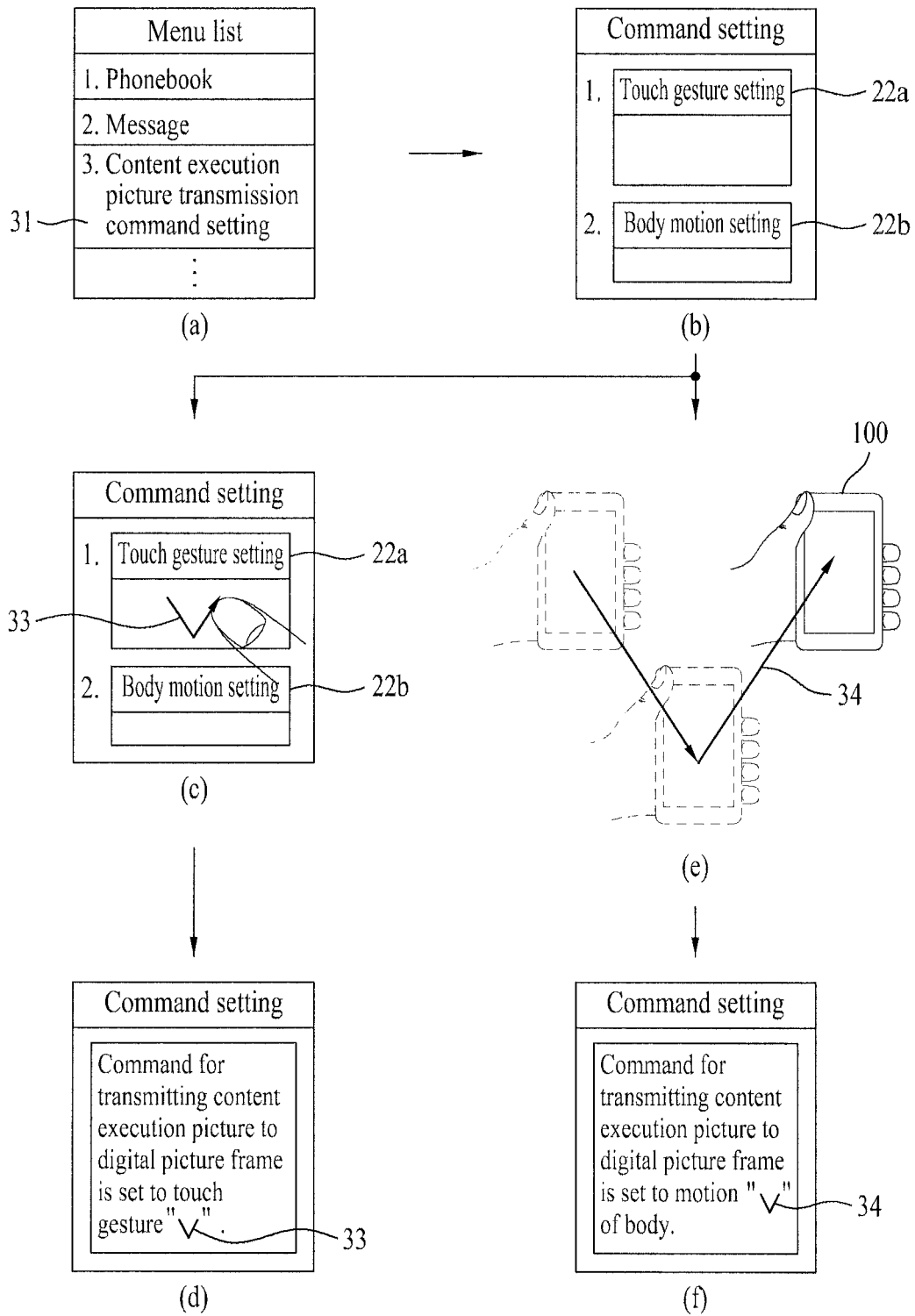
FIGS. 10(a)-(f) are diagrams showing examples of screens for setting a command for transmitting content from a mobile terminal to a digital picture frame according to the method of FIG. 9.

The command setting window shown in FIG. 10 (b) includes a touch gesture setting window 22a and a body motion setting window 22b. If the touch gesture setting window 22a is touched by a user, the controller 180 activates the touch gesture setting window 22a and then detects whether a user's touch gesture is input into the touch gesture setting window 22a.

If a touch gesture 23 having a specific pattern 'V' is input via the touch gesture setting window 22a by the user (S34) as shown in FIG. 10 (c), controller 180 recognizes the touch gesture 23 having the pattern V as a command for transmitting picture information to the digital picture frame 200. The touch gesture 23 is then mapped to an operation of transmitting picture information to the digital picture frame 200 and information corresponding to this mapping and the gesture is stored in memory 160 (S35) as shown in FIG. 10 (d). The touch gesture 33 may include both a contact touch and a proximity touch.

Alternatively, if the body motion setting window 22b is touched by a user, the controller 180 drives the acceleration sensor 142 and then uses the acceleration sensor 142 to detect whether a motion of the body of the mobile terminal 100 is input.

If a specific motion 34 of the body of the mobile terminal 100 is input from the user as detected by acceleration sensor 142 (S36) as shown in FIG. 10 (e), the controller 180 recognizes the input motion 24 of the body as a command for transmitting picture information to the digital picture frame 200. The controller then maps the body motion 24 to an operation for transmitting picture information to the digital picture frame 200 and then this mapping is stored in the memory 160 (S37) as shown in FIG. 10 (f).

In the following description, a process for transmitting picture information displayed in the mobile terminal 100 to the digital picture frame 200 based on the touch gesture or body motion (set in FIGS. 9 and 10(a)-(f)) is explained.

Figure 11:
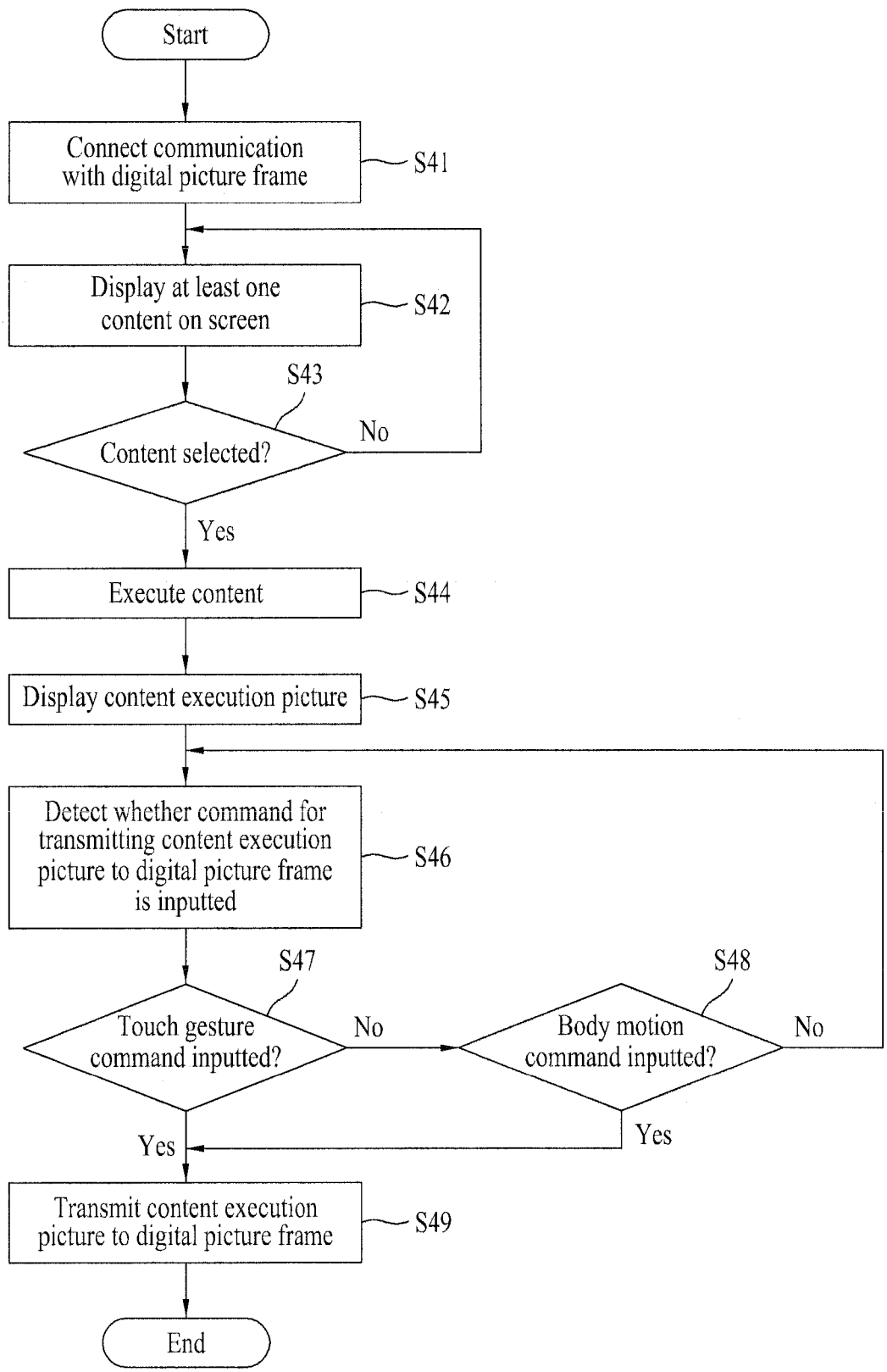
FIG. 11 is a diagram showing steps included in another embodiment of a method for transmitting content displayed in a mobile terminal to a digital picture frame using a touch gesture or a body motion.

FIG. 11 shows steps included in another embodiment of a method for transmitting picture information displayed in a mobile terminal to a digital picture frame based on a touch gesture or body motion according to a second embodiment of the present invention, and FIGS. 12 to 17 are diagrams of screens that may be used with this method.

Referring to FIG. 11, a short-range communication connection is established with digital picture frame 200 (S41). The controller 180 of the mobile terminal 100 then displays at least one content on the screen of the touchscreen 151 (S42). If a user selects a specific content (S43), the controller 180 of the mobile terminal 100 executes the selected content (S44) for display on the touchscreen 151 (S45).

The content may include at least one of text, an image, a message, contact information on contacts within a phonebook in the terminal, an audio file, a photo file, a video file, a game file, schedule information, a document file, an e-dictionary file, a calculator file, or information relating to one or more web pages. According to one embodiment, the content may include data existing within a menu function of the mobile terminal 100. Also, the contact information may include a mobile phone number, name, home phone number, and/or email address of a correspondent party.

While content is displayed on the touchscreen 151, the controller 180 of the mobile terminal 100 detects whether a command for transmitting the content to the digital picture frame 200 (as set in FIGS. 9 and 10) is input (S46). More specifically, the controller 180 detects whether a user's touch gesture 33 (as set in FIGS. 9 and 10) is input to the touchscreen 151 or whether body motion 34 (as set in FIGS. 9 and 10) is input via the acceleration sensor 142.

If the user's touch gesture 33 is input to the touchscreen 151 (S47) or body motion 23 is input via the acceleration sensor 142 (S48), controller 180 transmits the content displayed on touchscreen 151 to the digital picture frame 200 via the short-range communication module 114 (S49).

FIG. 12(a) shows that a phonebook content execution picture 41a is displayed on the touchscreen 151 of the mobile terminal 100. If touch gesture 33 as set in FIGS. 9 and 10 is input into touchscreen 151 by a user, controller 180 transmits the phonebook content execution picture information 41a, which is currently displayed on touchscreen 151, to the digital picture frame 200 via the short-range communication module 114.

Figure 12:
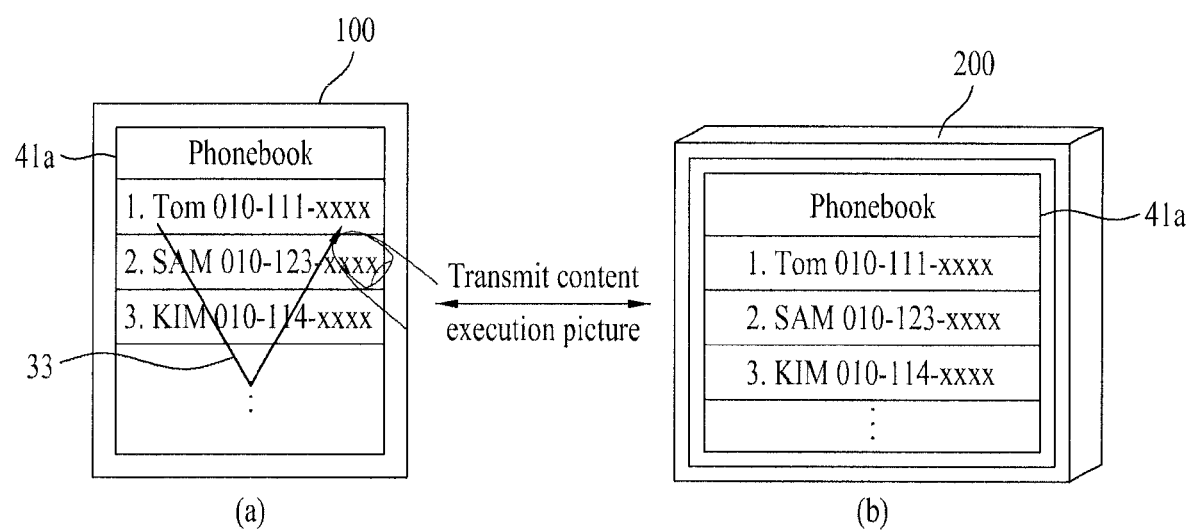
FIGS. 12 to 17 are diagrams of screens that may be used to transmit content from a mobile terminal to a digital picture frame using a touch gesture or body motion.

FIG. 12 (b) shows that control unit 260 of digital picture frame 200 displays the phonebook content execution picture information 41a, which is received from the mobile terminal 100, on the display unit 250.

FIG. 13(a) shows that a phonebook content execution picture 41a is displayed on the touchscreen 151 of the mobile terminal 100. If body motion 34 of the terminal 100, as set in FIGS. 9 and 10 is detected via acceleration sensor 142, controller 180 transmits the phonebook content execution picture information 41a, which is currently displayed on the touchscreen 151, to digital picture frame 200 via short-range communication module 114.

Figure 13:
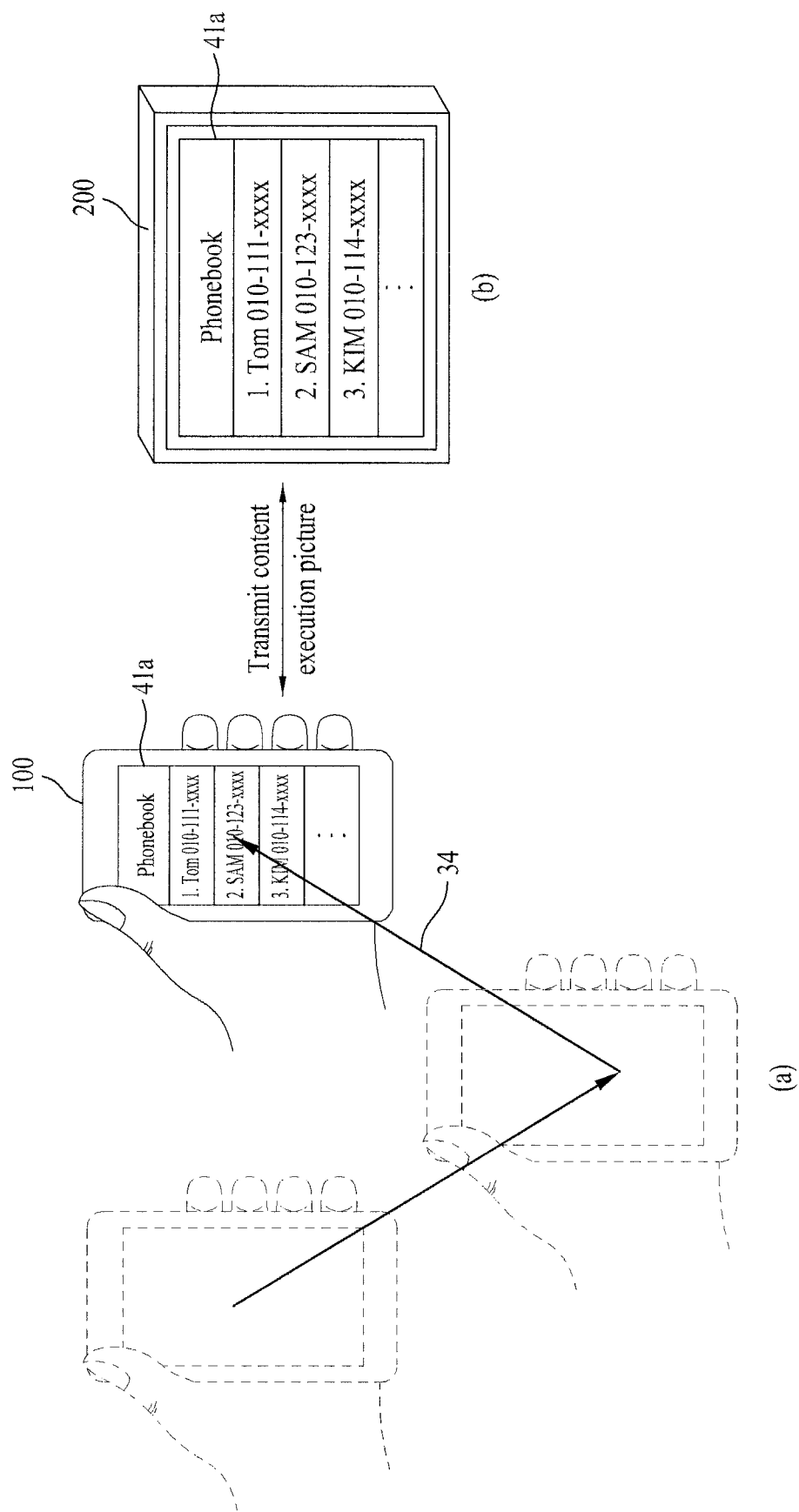

FIG. 13 (b) shows that control unit 260 of digital picture frame 200 displays the phonebook content execution picture information 41a, which is received from the mobile terminal 100, on the display unit 250.

Figure 14:
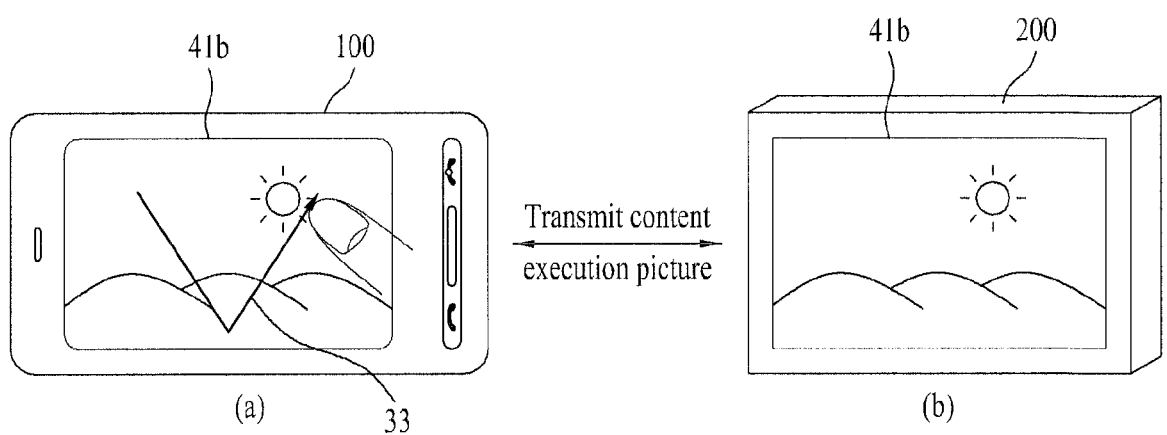

FIG. 14 (a) shows that an image content execution picture 41b is displayed on the touchscreen 151 of the mobile terminal 100. If touch gesture 33 as set in FIGS. 9 and 10 is input into the touchscreen 151 by a user, controller 180 transmits the image content execution picture information 41b, which is currently displayed on the touchscreen 151, to the digital picture frame 200 via the short-range communication module 114.

FIG. 14 (b) shows that control unit 260 of digital picture frame 200 displays the image content execution picture information 41b, which is received from the mobile terminal 100, on the display unit 250.

Figure 15:
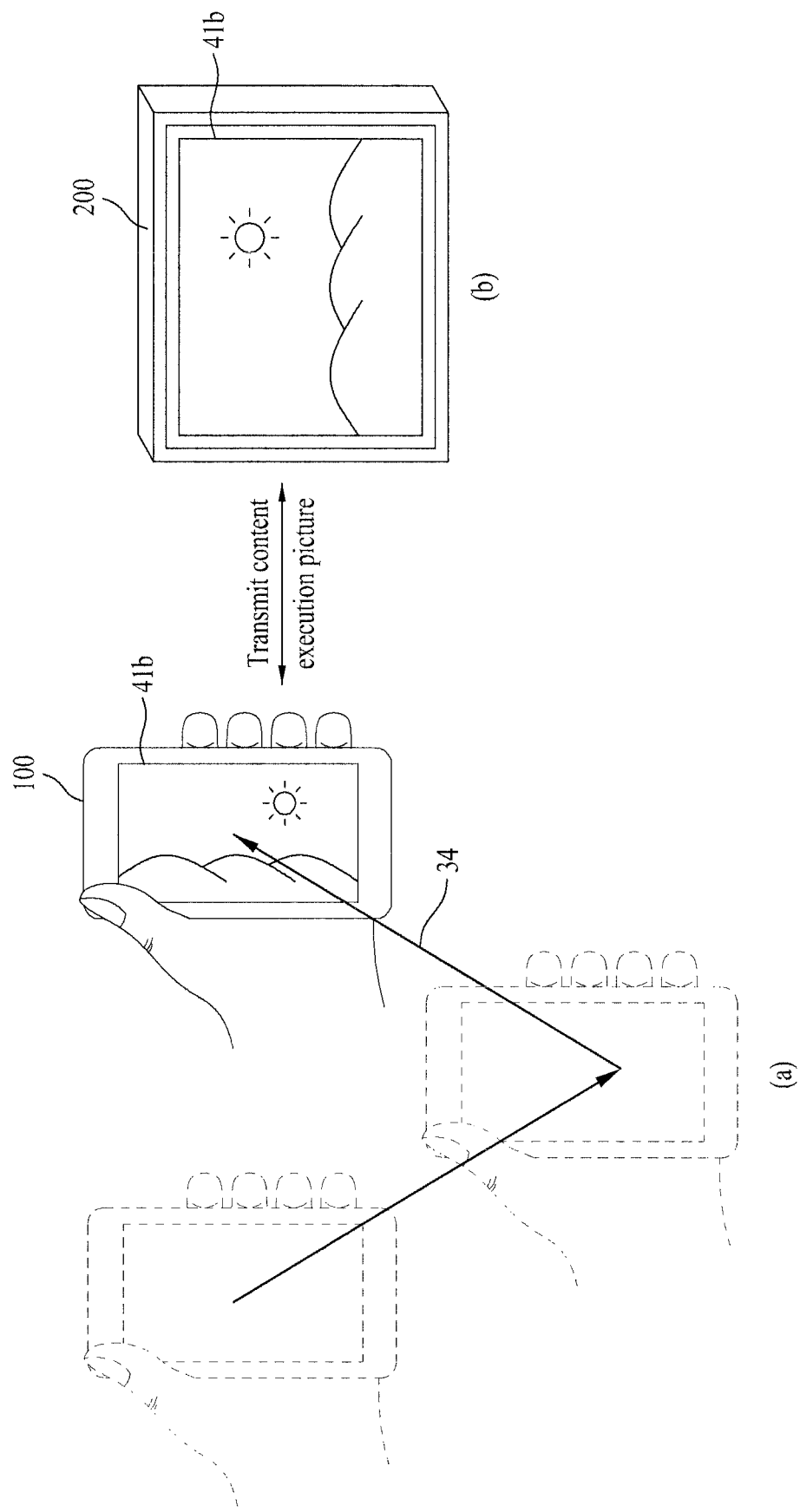

FIG. 15 (a) shows that an image content execution picture 41b is displayed on the touchscreen 151 of the mobile terminal 100. If body motion 34 of the body of mobile terminal 100 as set in FIGS. 9 and 10 is detected via acceleration sensor 142, controller 180 transmits the image content execution picture information 41b, which is currently displayed on the touchscreen 151, to the digital picture frame 200 via the short-range communication module 114.

FIG. 15 (b) shows that control unit 260 of digital picture frame 200 displays the image content execution picture information 41b, which is received from the mobile terminal 100, on the display unit 250.

FIG. 16(a) shows that a received message content execution picture 41c is displayed on the touchscreen 151 of the mobile terminal 100. If touch gesture 33 as set in FIGS. 9 and 10 are input into touchscreen 151 by a user, controller 180 transmits the received message content execution picture information 41c, which is currently displayed on the touchscreen 151, to the digital picture frame 200 via the short-range communication module 114.

Figure 16:
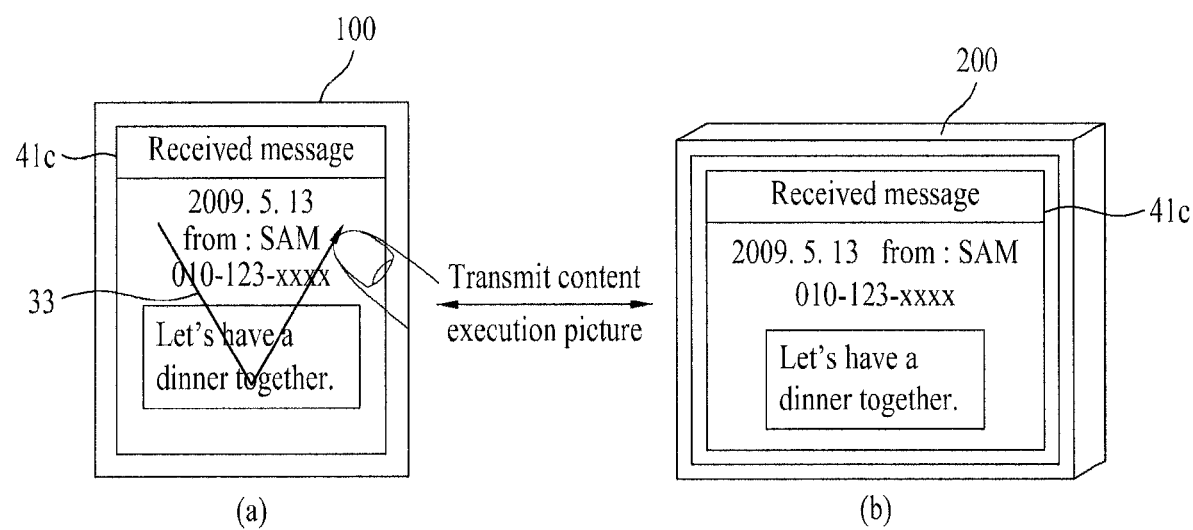

FIG. 16 (b) shows that control unit 260 of digital picture frame 200 displays the received message content execution picture information 41c, which is received from the mobile terminal 100, on the display unit 250.

Figure 17:
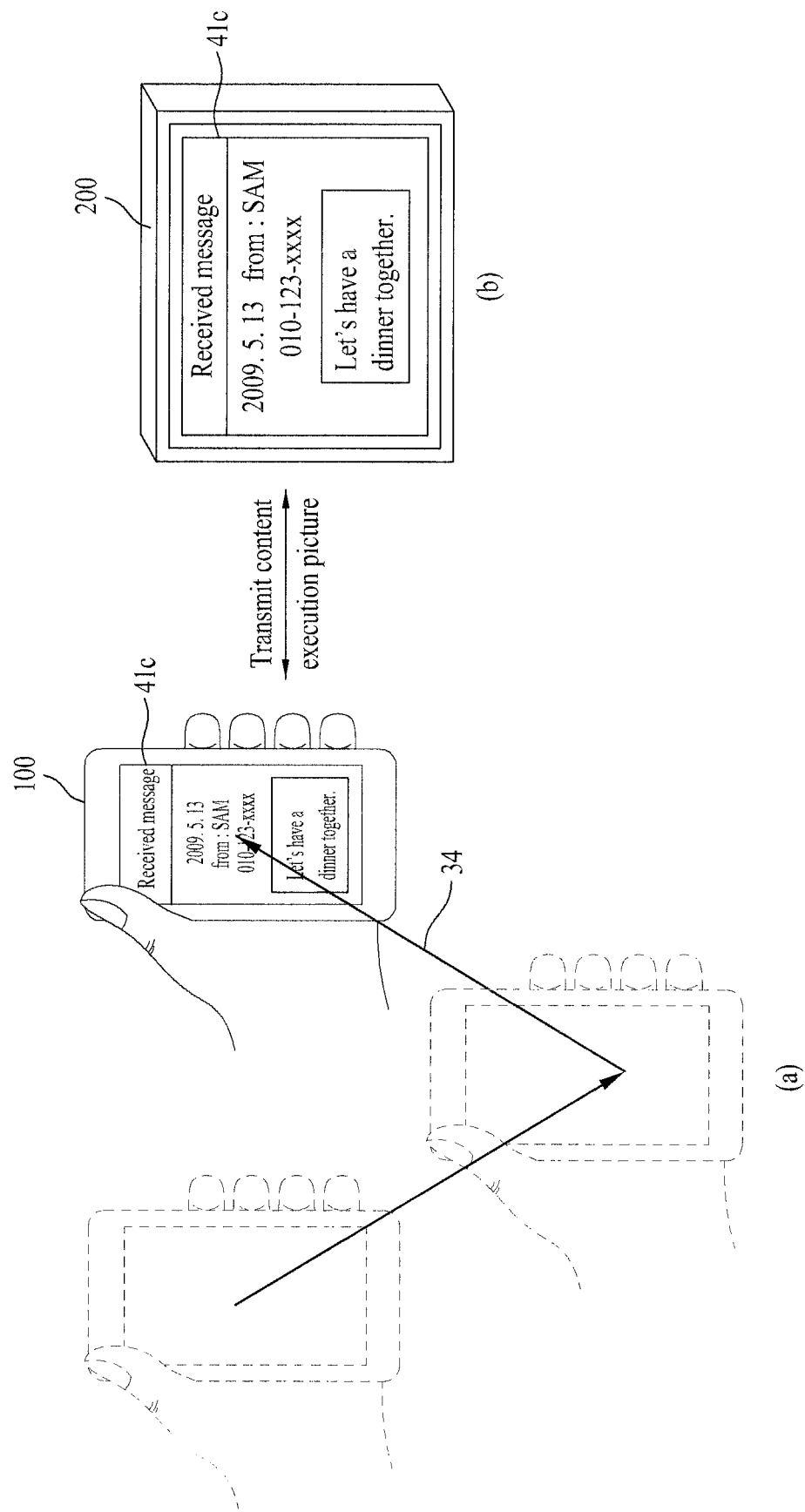

FIG. 17 (a) shows that a received message content execution picture 41c is displayed on the touchscreen 151 of the mobile terminal 100. If body motion 34 of mobile terminal 100 as set in FIGS. 9 and 10 is detected via acceleration sensor 142, controller 180 transmits the received message content execution picture information 41c, which is currently displayed on the touchscreen 151, to the digital picture frame 200 via the short-range communication module 114.

FIG. 17 (b) shows that control unit 260 of digital picture frame 200 displays the received message content execution picture information 41c, which is received from the mobile terminal 100, on the display unit 250.

Third Embodiment

In a third embodiment, a connection between mobile terminal 100 and digital picture frame 200 (established, for example, based on the first embodiment) is disconnected to prevent unnecessary power consumption when a change is not performed on the mobile terminal 100 or the digital picture frame 200 for a predetermined period of time. The third embodiment may therefore serve as a basis for extending operation (or usable times) of the mobile terminal 100 and the digital picture frame 200, for example, by saving battery power.

Figure 18:
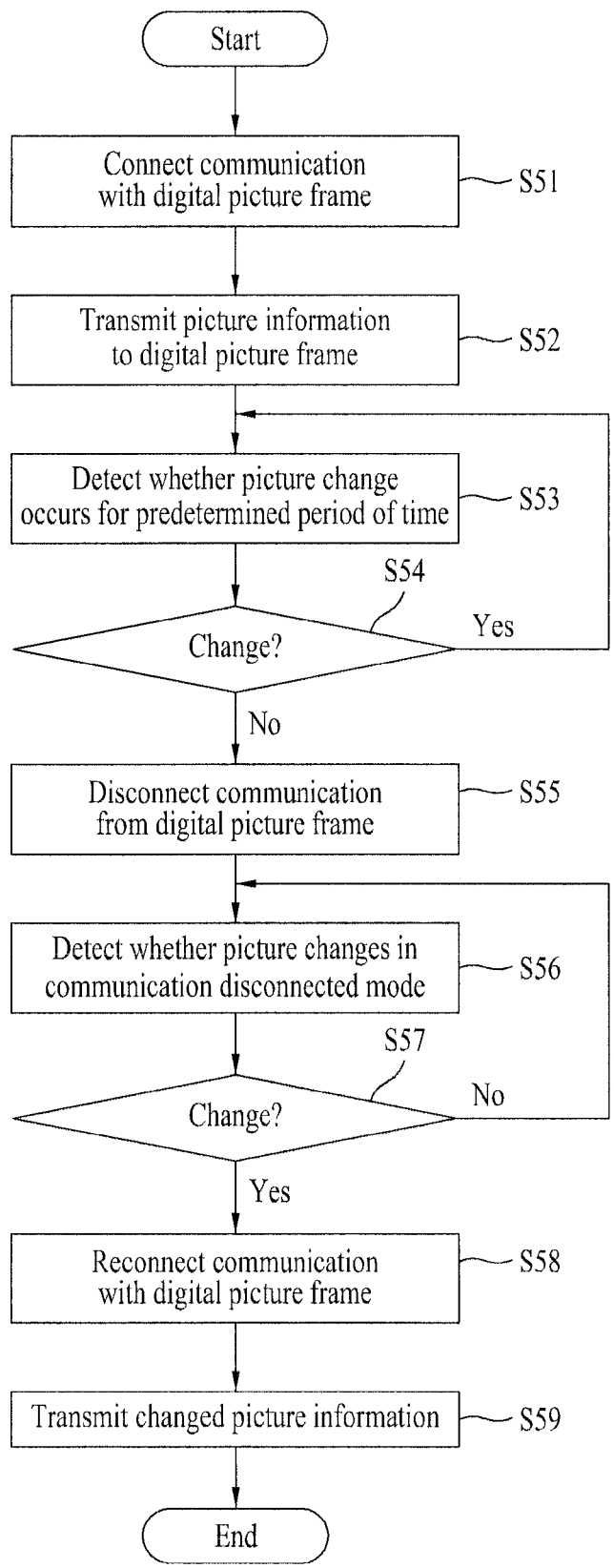
FIG. 18 is a diagram showing steps included in one embodiment of a method for performing a disconnection and reconnection between a mobile terminal and a digital picture frame based on the presence or absence of a content change in the mobile terminal.
Figure 19:
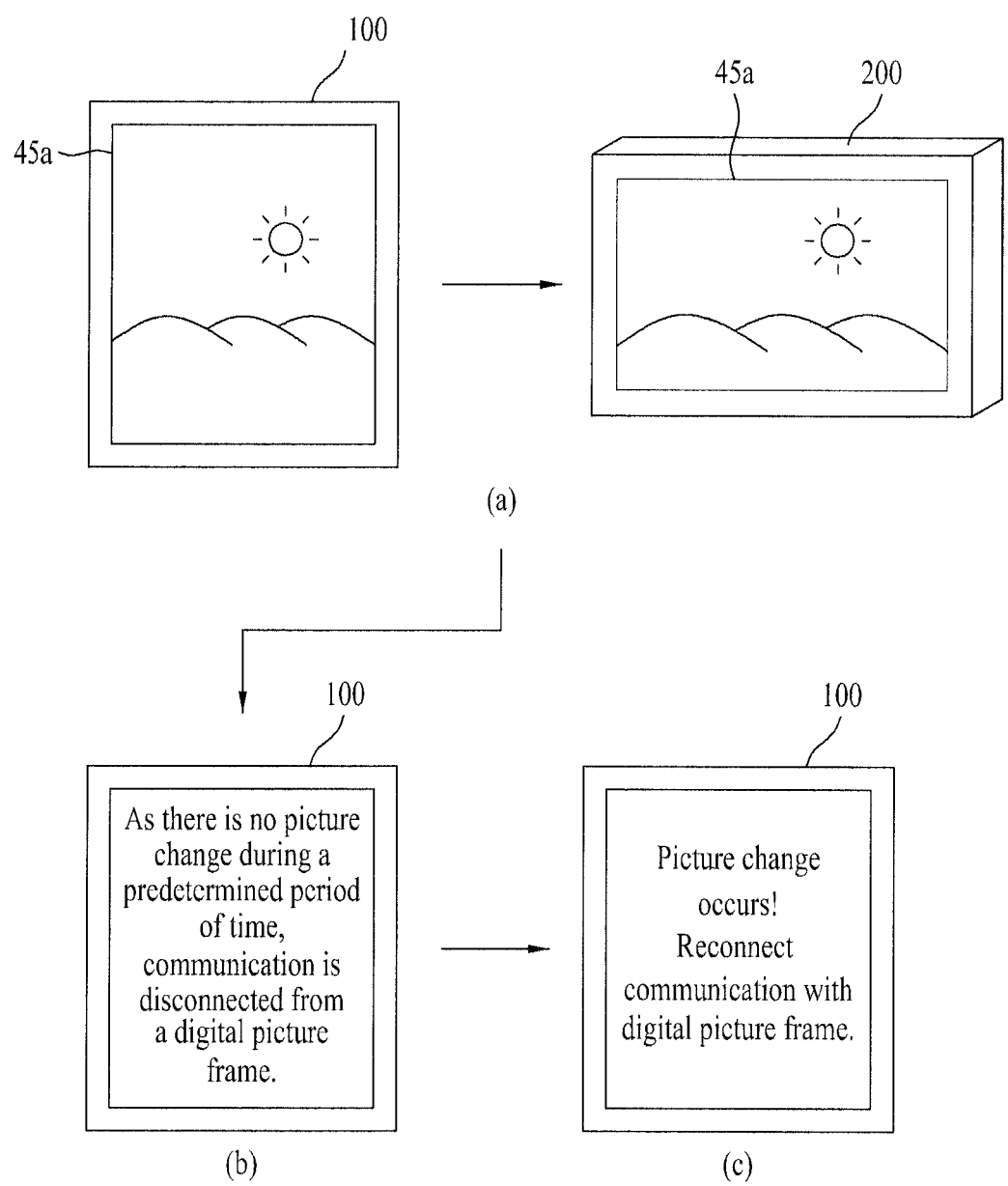
FIGS. 19 to 21 are diagrams of screen relating to the method of FIG. 18.
Figure 20:
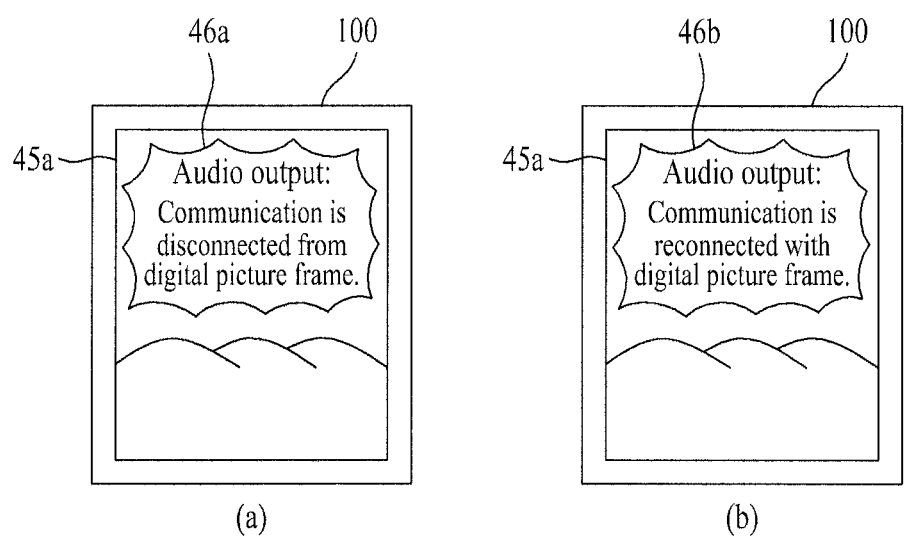
Figure 21:
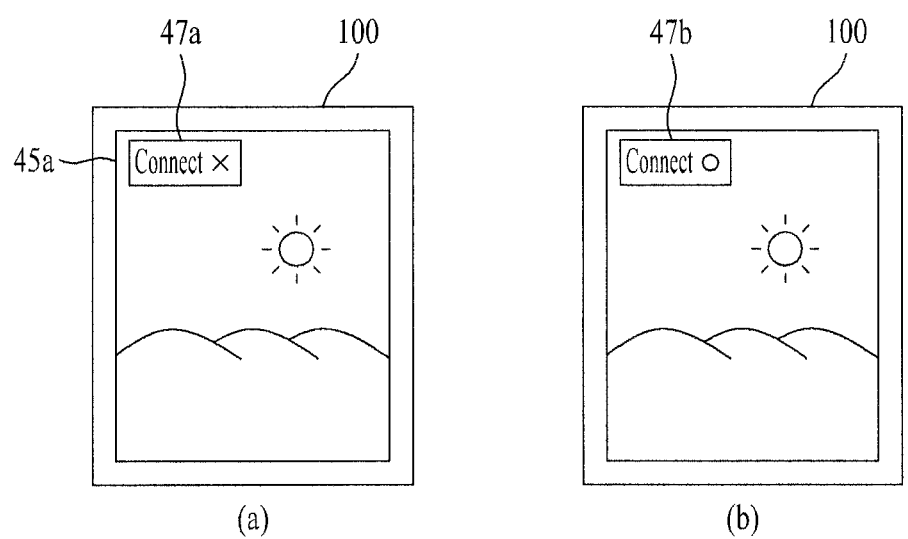

FIG. 18 shows steps included in a method for disconnecting a communication link between a mobile terminal and digital picture frame based on the absence of a change operation performed on the mobile terminal, and then for reestablishing that connection, and FIGS. 19 to 21 are diagrams of screens that may be used with the method of FIG. 18.

Referring to FIGS. 18 to 21, the controller 180 of the mobile terminal 100 establishing a connection with digital picture frame 200 through short-range communication module 114 according to, for example, the first or second embodiments described herein (S51) and then transmits content (e.g., picture information) 45a displayed on the touchscreen 151 to the digital picture frame 200 (S52) as shown in FIG. 19 (a).

The controller 180 keeps detecting whether picture information 45a displayed on the touchscreen 151 changes during a predetermined period of time (S53). The predetermined period of time may be set by a user, e.g., controller 180 may provide a user with a menu for setting or resetting the predetermined period of time. The user is then able to change the period of time through the menu.

The controller 180 may check whether picture information 45a transmitted to digital picture frame 200 in step S52 is different from picture information currently displayed on the touchscreen 151. If the picture information 45a transmitted to digital picture frame 200 in step S52 is identical to the picture information currently displayed on touchscreen 151, controller 180 determines that there is no change of the current picture information.

If the picture information 45a transmitted to digital picture frame 200 in the step S52 is different from the picture information displayed on touchscreen 151 currently, controller 180 determines that a change has occurred in the current picture information.

As a result of this detection, if there is no change of the picture information during the predetermined period of time (S54), controller 180 recognizes that the user of the mobile terminal 100 has not transmitted new picture information to the digital picture frame 200 and then releases the connection with the digital picture frame 200 by controlling the short-range communication module 114 (S55) as shown in FIG. 19 (b).

If the connection is released from digital picture frame 200, referring to FIG. 20(a), controller 180 may output a message and/or sound 46a for announcing release of the connection to the audio output module 152.

If the communication connection is released from the digital picture frame 200, referring to FIG. 21 (a), controller 180 displays an indicator 47a to indicate release of the connection on the touchscreen 151. If indicator 47a is selected by the user, referring to FIG. 19 (c), controller 180 is able to reconnect a communication with digital picture frame 200 by controlling the short-range communication module 114.

While connection with digital picture frame 200 is released, controller 180 detects again whether a change occurs on a current picture displayed on touchscreen 151 (S56).

If a screen change occurs on the touchscreen 151 (S57), because a user of the mobile terminal 100 is able to transmit the changed picture information to the digital picture frame 200 again using the touch gesture or the body motion (described, for example, with reference to the second embodiment), communication with the digital picture frame 200 is re-connected by controlling the short-range communication module 114 (S58) as shown in FIG. 19 (c), and then the changed picture information is transmitted to the digital picture frame 200 according to the user's touch gesture or the body motion (S59).

If communication with the digital picture frame 200 is reconnected, referring to FIG. 20(b), controller 180 may output a sound 46b for announcing the reconnection to the audio output module 152. Alternatively, if communication with the digital picture frame 200 is reconnected, referring to FIG. 21 (b), controller 180 may display an indicator 47b to indicate that reconnected has been established on the touchscreen 151.

In the following description, a method for controlling brightness of a touchscreen of mobile terminal 100 based on presence or absence of a screen change of the mobile terminal 100 is explained with reference to FIGS. 22 and 23.

Figure 22:
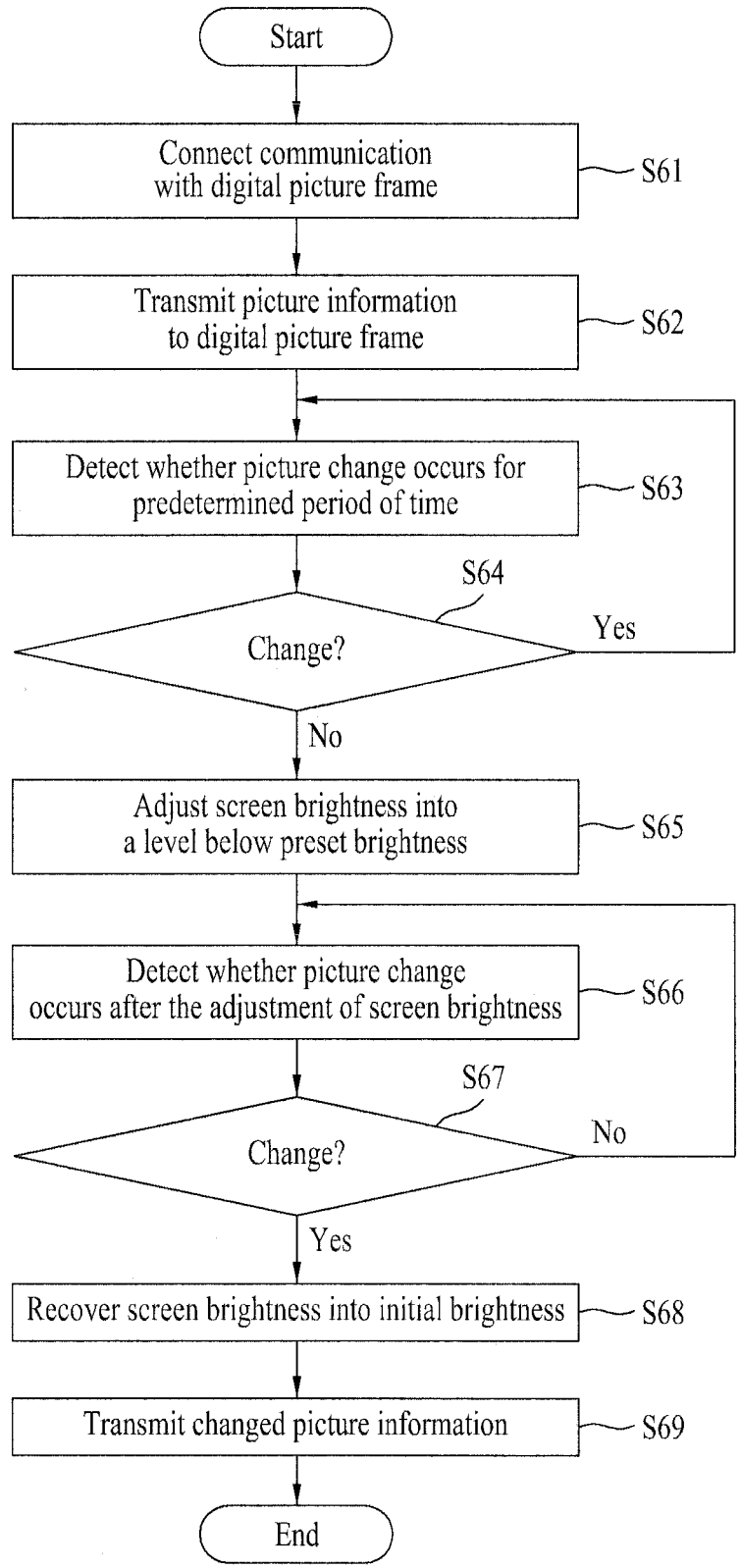
FIG. 22 is a diagram showing steps included in one embodiment of a method for controlling screen brightness based on the absence of a content change in a mobile terminal.
Figure 23:
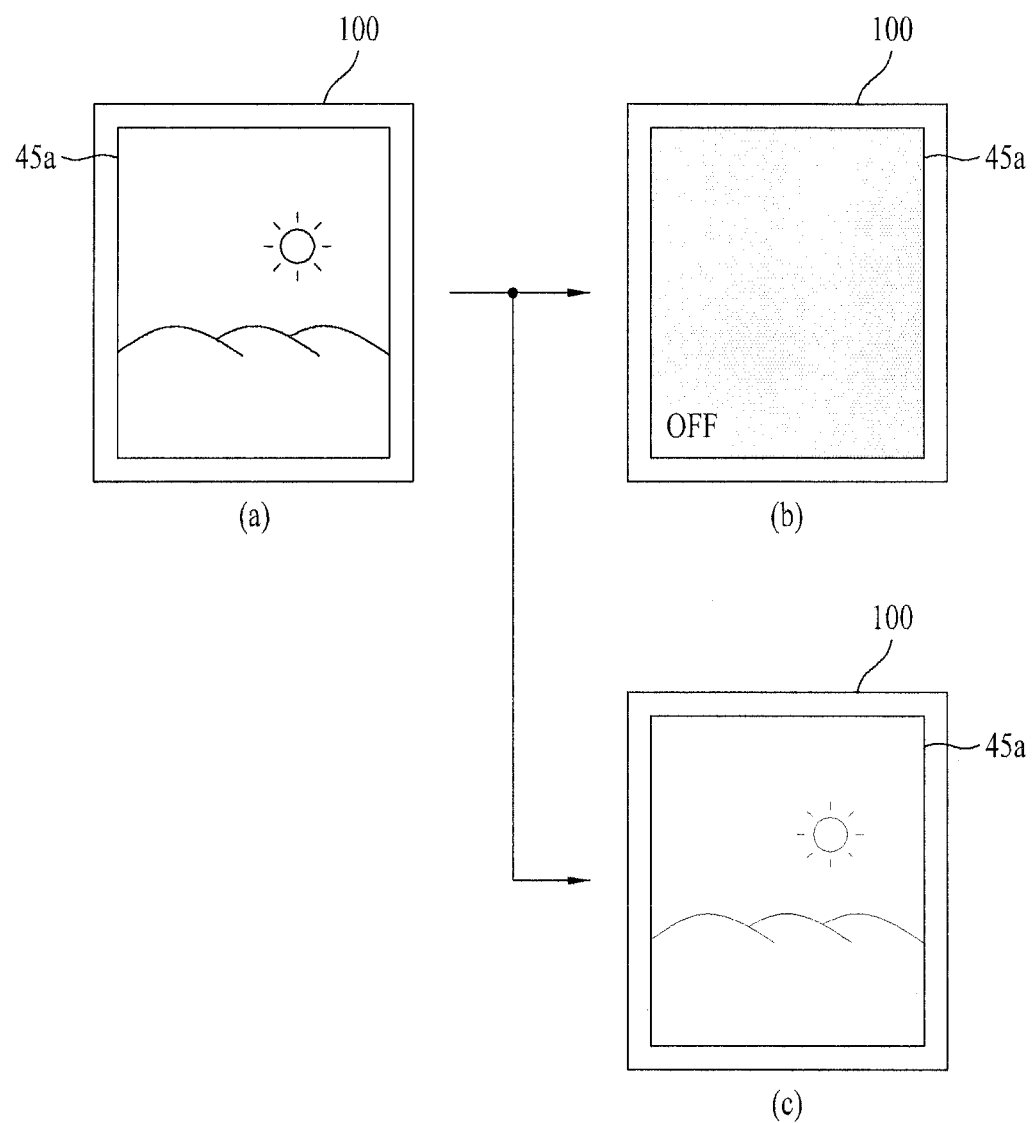
FIG. 23 is a diagram of one type screens relating to the method of FIG. 22.

FIG. 22 shows steps included in one embodiment of a method for controlling screen brightness based on the presence or absence of a content change in a mobile terminal, while the mobile terminal and digital picture frame are connected, and FIG. 23 shows an example of screens that may be related to the method of FIG. 22.

Referring to FIG. 22 and FIG. 23, controller 180 of the mobile terminal 100 establishes a connection with digital picture frame 200 by controlling the short-range communication module 114 (S61) and then transmits content (e.g., picture information) 45a displayed on touchscreen 151 to the digital picture frame 200 (S62) as shown in FIG. 23 (a).

The controller 180 keeps detecting whether picture information 45a displayed on the touchscreen 151 changes during a predetermined period of time (S63). As a result of the detection, if there is no change in picture information 45a during the predetermined period of time (S64), controller 180 recognizes that new picture information is not currently displayed on the touchscreen 151 and then adjusts a screen brightness of the touchscreen 151 to a level below a preset brightness level by controlling power supply unit 190 (S65).

The controller 180 may adjust screen brightness of touchscreen 151 to a level below the preset brightness level as in FIG. 23 (c), or alternatively turn off touchscreen 151 as in FIG. 23 (b). For example, if there is no change in picture information 45a in step S64, controller 180 may adjust a brightness level of a backlight unit for illuminating the user input unit 130 to a level below a preset brightness level or may turn off the backlight unit.

The controller 180 may detect again whether a change has occurred to the picture displayed on touchscreen 151 after screen brightness of touchscreen 151 has been adjusted (S66). If a picture change has occurred on touchscreen 151 (S67), controller 180 recovers the adjusted screen brightness of touchscreen 151 to an initial brightness level (S68) and then transmits the changed picture information to the digital picture frame 200 (S69).

Figure 24:
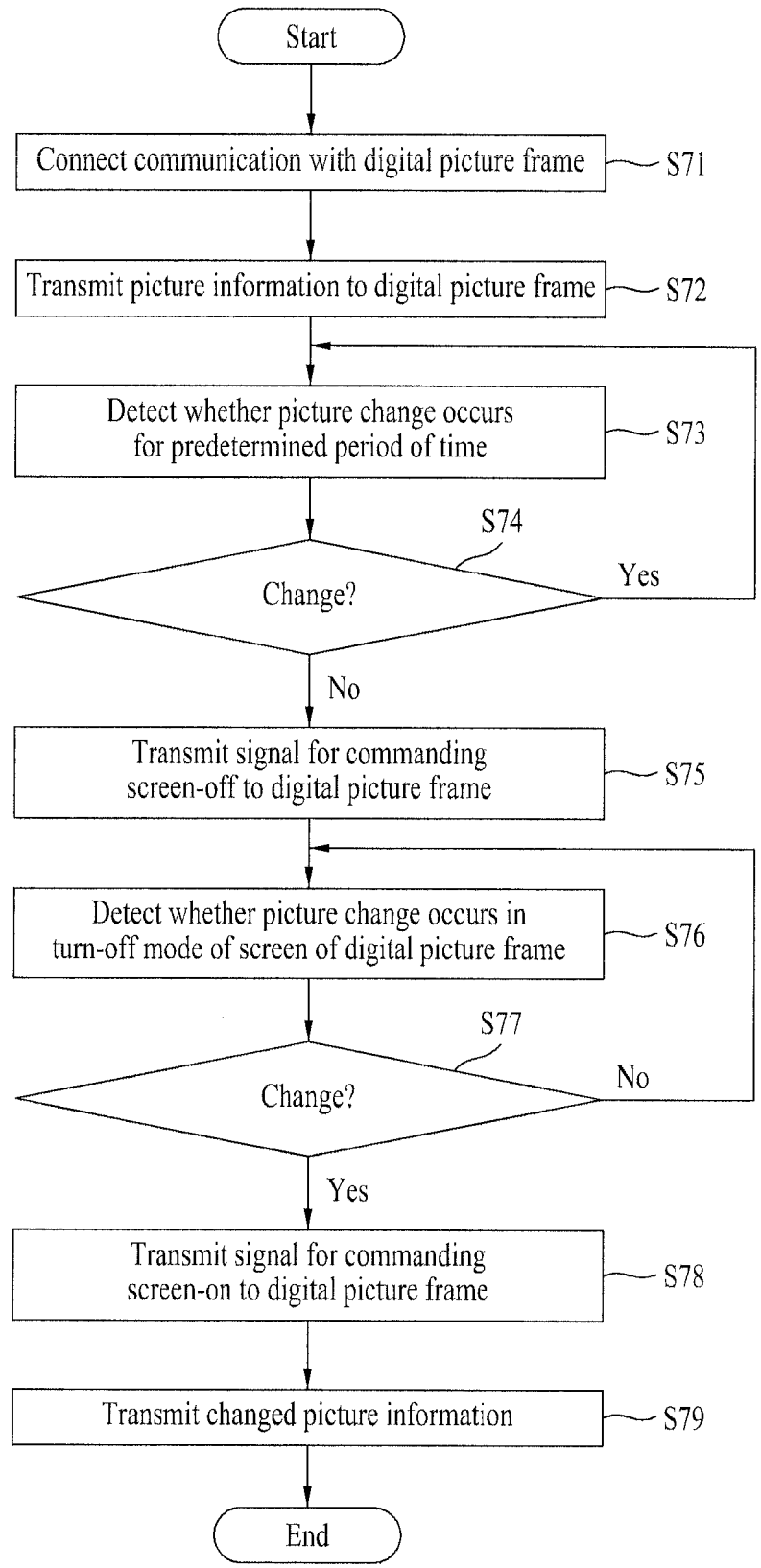
FIG. 24 is a diagram showing steps included in an embodiment of a method for controlling screen brightness of a digital picture frame.

FIG. 24 shows steps included in one embodiment of a method for controlling a screen brightness of a digital picture frame based on the presence or absence of a content change in the mobile terminal, while a connection exists between the mobile terminal and digital picture frame.

Initially, controller 180 of the mobile terminal 100 connects with the digital picture frame 200 by controlling the short-range communication module 114 (S71) and then transmits content (e.g., picture information) displayed on the touchscreen 151 to the digital picture frame 200 (S72).

Afterwards, controller 180 keeps detecting whether the picture information displayed on the touchscreen 151 changes during a predetermined period of time (S73).

As a result of the detection, if there is no change of the picture information during the predetermined period of time (S74), since new picture information is not currently displayed on touchscreen 151 and the picture information transmitted to the digital picture frame 200 is not changed, controller 180 generates a signal for commanding a screen-off (OFF) of the display unit 250 included in the digital picture frame 200 and then transmits the generated signal to the digital picture frame 200 (S75).

While the screen of digital picture frame 200 is turned off, controller 180 detects again whether a change has occurred on the screen of the touchscreen 151 (S76).

If a picture change occurs on touchscreen 151 (S77), controller 180 generates a signal for commanding a screen-on (ON) of the displayed unit 250 included in the digital picture frame 200 and then transmits the generated signal to digital picture frame 200 (S78).

If the screen of the digital picture frame 200 is tuned on, the controller transmits the changed picture information to the digital picture frame 200 (S79).

Figure 25:
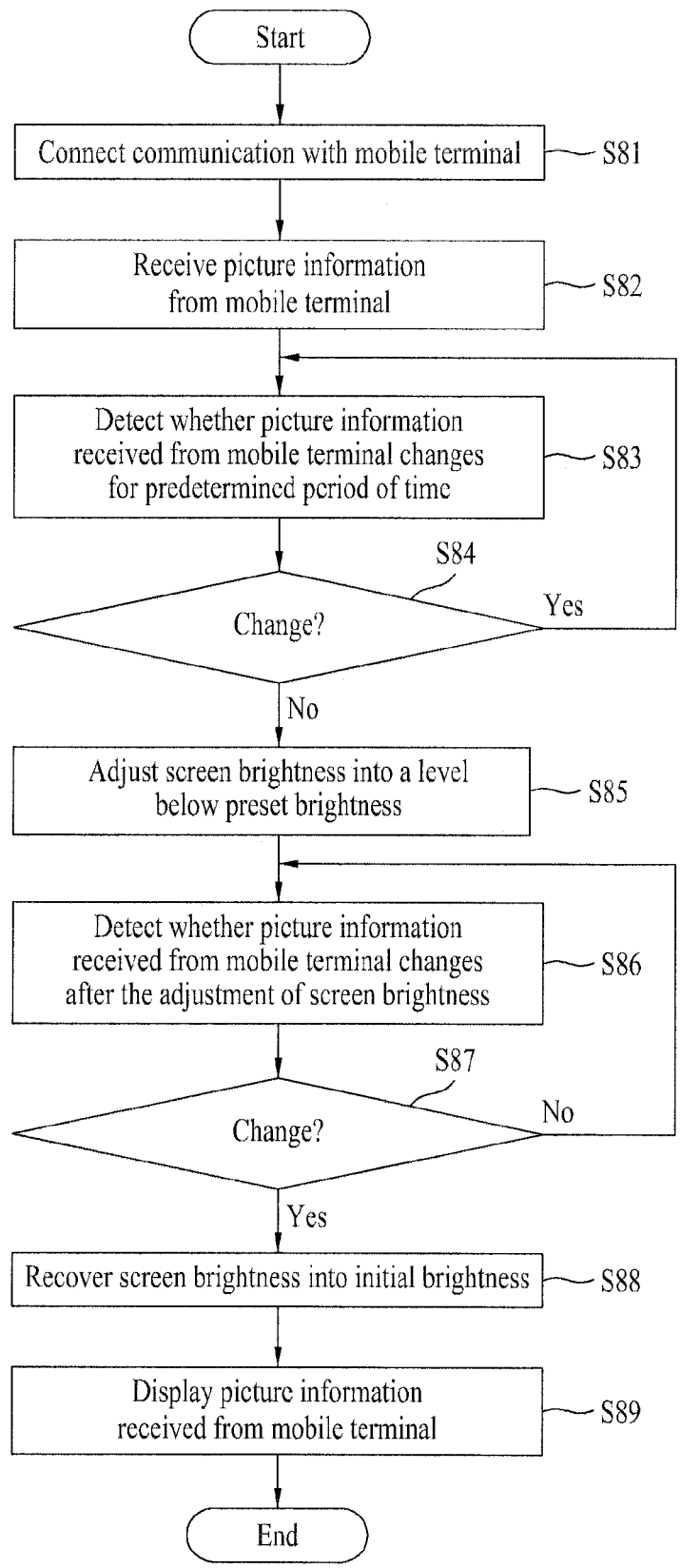
FIG. 25 is a diagram showing steps included in another embodiment of a method for controlling screen brightness of a digital picture frame.
Figure 26:
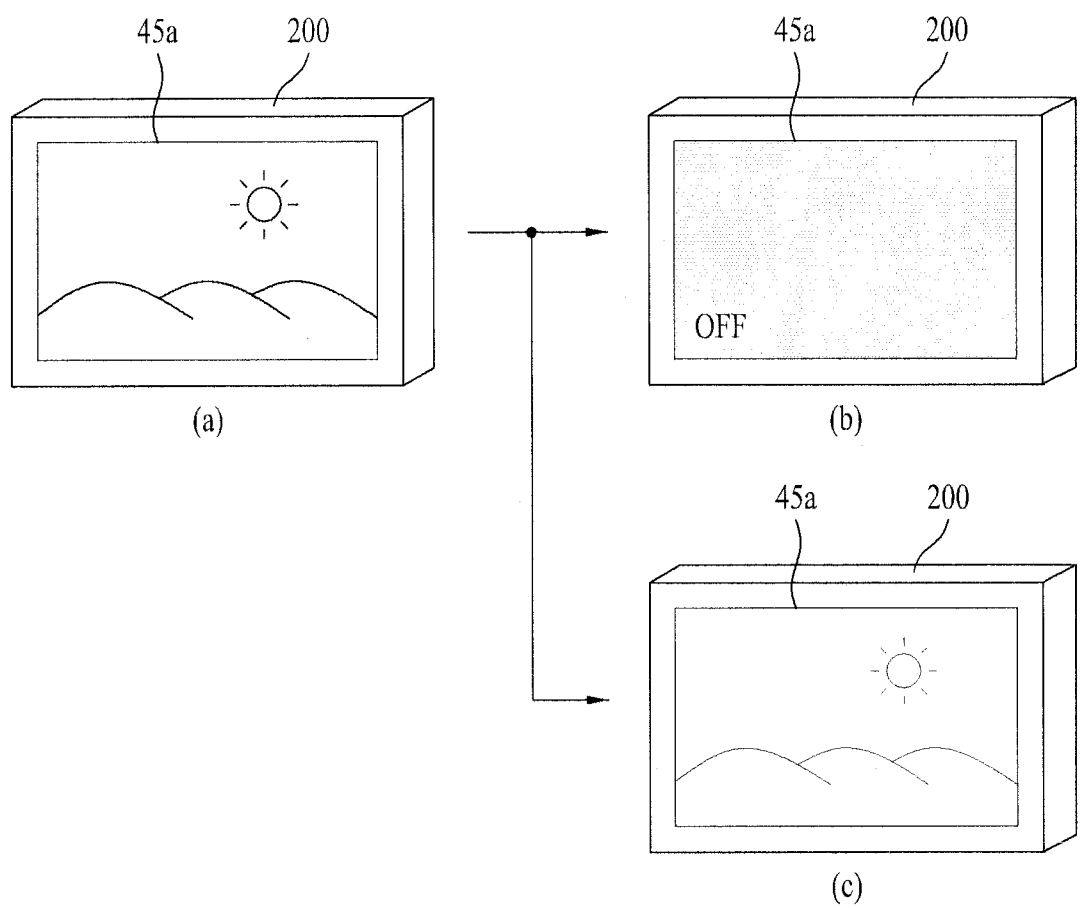
FIG. 26 is a diagram showing screens relating to the method of FIG. 25.

FIG. 25 shows steps included in one embodiment of a method for allowing a digital picture frame to control screen brightness based on a presence or absence of content change information received from a mobile terminal, and FIG. 26 shows examples of screens corresponding to the method of FIG. 25.

While a connection exists between control unit 260 of the digital picture frame 200 and mobile terminal 100 (S81), control unit 260 receives picture information from the mobile terminal 100 via the wireless communication unit 210 and then displays the received picture information on the display unit 250 (S82) as shown in FIG. 26 (a).

The control unit 260 detects whether content (e.g., picture) information 45a received from mobile terminal 100 has changed during a predetermined period of time (S83). The predetermined period of time can be set to different times by a user. For example, control unit 260 may provide a user with a menu for resetting the predetermined period of time. The user is then able to change the period of time through the menu.

The control unit 260 checks whether picture information 45a of the mobile terminal 100, which is displayed in the display unit 250 in the displaying step S82, is different from the picture information received from the mobile terminal 100. If picture information 45a of the mobile terminal 100, which is displayed in the display unit 250 in step S82, is identical to the picture information received from the mobile terminal 100, control unit 260 determines that there is no change of the current picture information.

If the picture information 45a of the mobile terminal 100, which is displayed in the display unit 250 in the displaying step S82, is different from the picture information received from the mobile terminal 100, control unit 260 determines that a change occurs in the current picture information.

If no change of picture information 45a is detected during the predetermined period of time (S84), controller 180 adjusts a screen brightness of the display unit 250 to a level below a predetermined brightness (S85). In particular, control unit 260 may adjust the screen brightness of the display unit 250 to a level below a preset brightness level as shown in FIG. 26 (c) or may turn off the display unit 250.

After the screen brightness of the display unit 250 has been adjusted, control unit 260 detects whether the picture information received from the mobile terminal 100 is different from the picture information displayed on the display unit 250 (S86).

If the picture information received from mobile terminal 100 is different from the picture information displayed on the display unit 250 (S87), control unit 260 recovers the adjusted screen brightness of the display unit 250 to an initial brightness (S88) and displays the picture information received from the mobile terminal 100 on the display unit 250 (S89).

Fourth Embodiment

In a fourth embodiment, the mobile terminal 100 transmits an image, in which at least one character is included and to which information relevant to the character is mapped, to the digital picture frame 200 based on a user's touch gesture or a motion of a body of the mobile terminal 100. The image received from the mobile terminal 100 is then displayed on the digital picture frame 200, and the information relevant to the character can be displayed around the character within the image.

Figure 27:
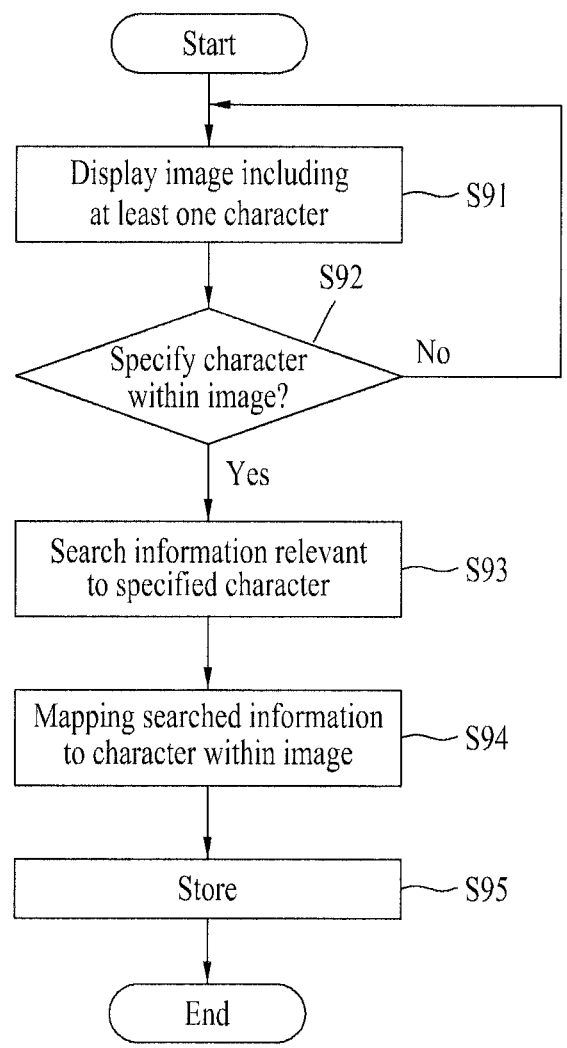
FIG. 27 is a diagram showing steps included in one embodiment of a method for mapping information of a character in an image displayed on the screen of a mobile terminal.

FIG. 27 shows steps included in one embodiment of a method for mapping information relevant to a character or object to an image including at least one character in a mobile terminal. FIGS. 28(a)-(d) shows screens relating to the method of FIG. 27.

Figure 28:
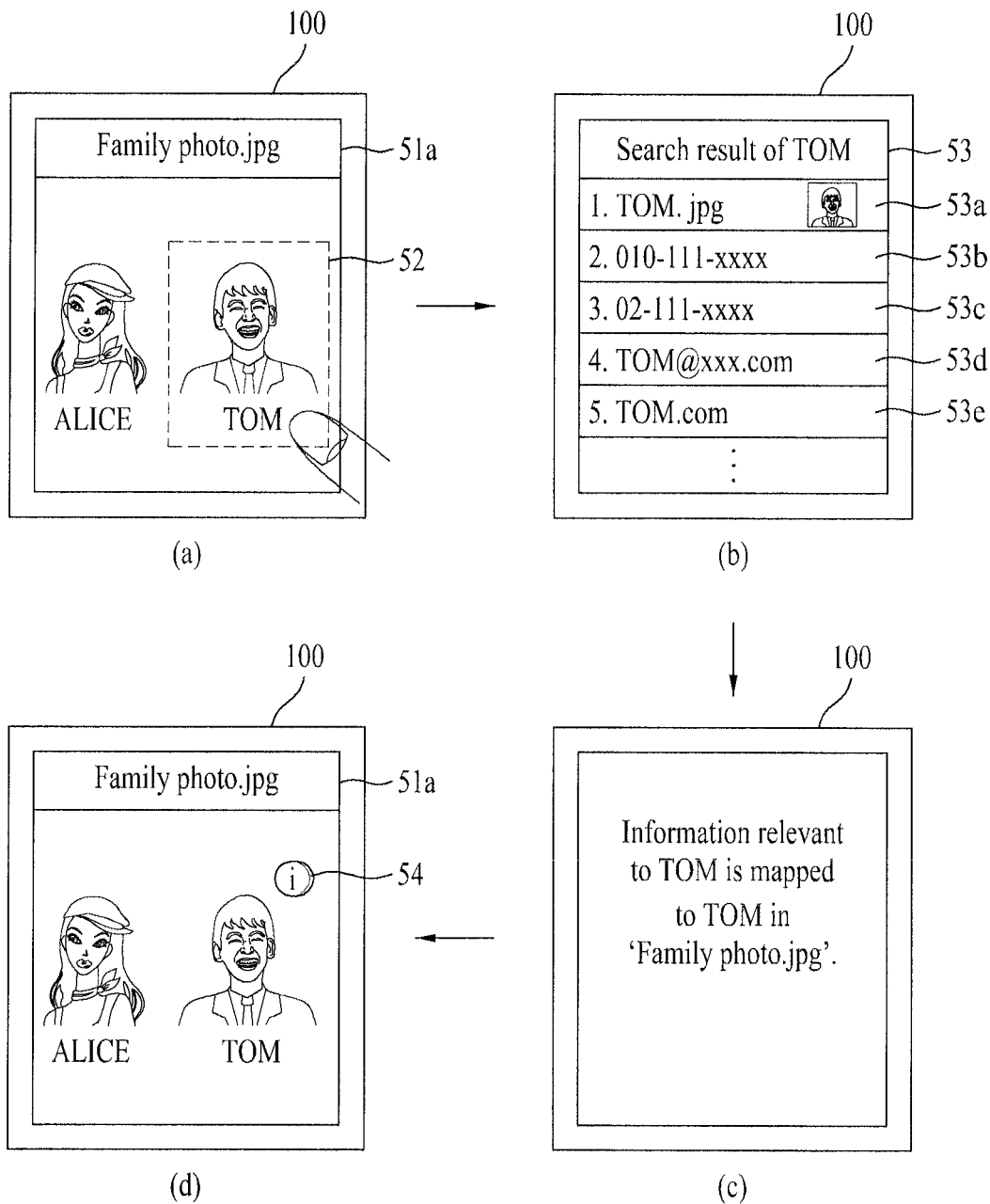
FIG. 28 is a diagram showing screens relating to the method of FIG. 27

If an image 51a, in which at least one character or object is included, is selected from images stored in memory 160, controller 180 of the mobile terminal 100 displays the selected image 51a on the touchscreen 151 (S91) as shown in FIG. 28 (a).

If a specific character (e.g., TOM) 52 within image 51a is specified through the user input unit 130 or touchscreen 151 (S92) as shown in FIG. 28 (a), controller 180 searches memory 160 for information relevant to the specified character (TOM) 52 (S93).

In particular, if character 52 is specified by a user, controller 180 displays a search window for searching information having a name TOM of the character 52 on the touchscreen 151. If the name 'TOM' of the character 52 is input by the user via the search window, controller 180 is able to search for information having or otherwise relating to the name TOM.

FIG. 28(b) shows one example of contact information 53 that includes or relates to an image 53a having the name (TOM) relevant to character 52, a mobile phone number 53b, a home phone number 53c, an email address 53d and a homepage address 53e, is searched by the controller 180.

If information 53 relevant to character 52 within image 51a is searched, the controller 180 maps the searched information 53 to the character 52 within the image 51a (94) and then stores image 51a having the information 53 mapped thereto in the memory 160 (S95) as shown in FIG. 28 (c).

When information 53 is mapped to image 51a, controller 180 obtains a display position of the character 52 within the image 51, inserts the recognized display position information of the character 52 into the information 53, and then maps the information 53, in which the display position information of the character 52 is included, to the image 51.

The display position of character 52 may include a display position range of pixels. For instance, when a size of the image 51a is 600×400 pixels (width×length), if a pixel range occupied by character 52 within the image 51a amounts to width of 531 to 534 and length of 96 to 100, the display position information of the character 52 corresponds to width of 531-534 and length of 96-100.

The reason why controller 180 insets the display position information of the character 52 into information 53 may be understood as follows. After the digital picture frame 200 has received image 51 having information 53 mapped thereto from mobile terminal 100, when digital picture frame 200 displays the received image 51a and information 53, the information 53 relevant to character 52 is displayed at the display position of the character 52 within image 51a by referring to the display position information of character 52 inserted in information 53.

Referring to FIG. 28(d), once the information relevant to the character 52 is mapped to the image 51a, controller 180 is able to display an indicator, which indicates that the information 53 has been mapped, by inserting the indicator 54 into the image 51a.

In the following description, a process for setting a command 'touch gesture' or 'body motion' is explained in detail with reference to FIGS. 29 to 32. In this case, the 'touch gesture' or 'body motion' is a command for transmitting the image 51a, to which the information 53 relevant to the character 52 is mapped according to the former process described with reference to FIG. 27 and FIG. 28, to the digital picture frame 200.

Figure 29:
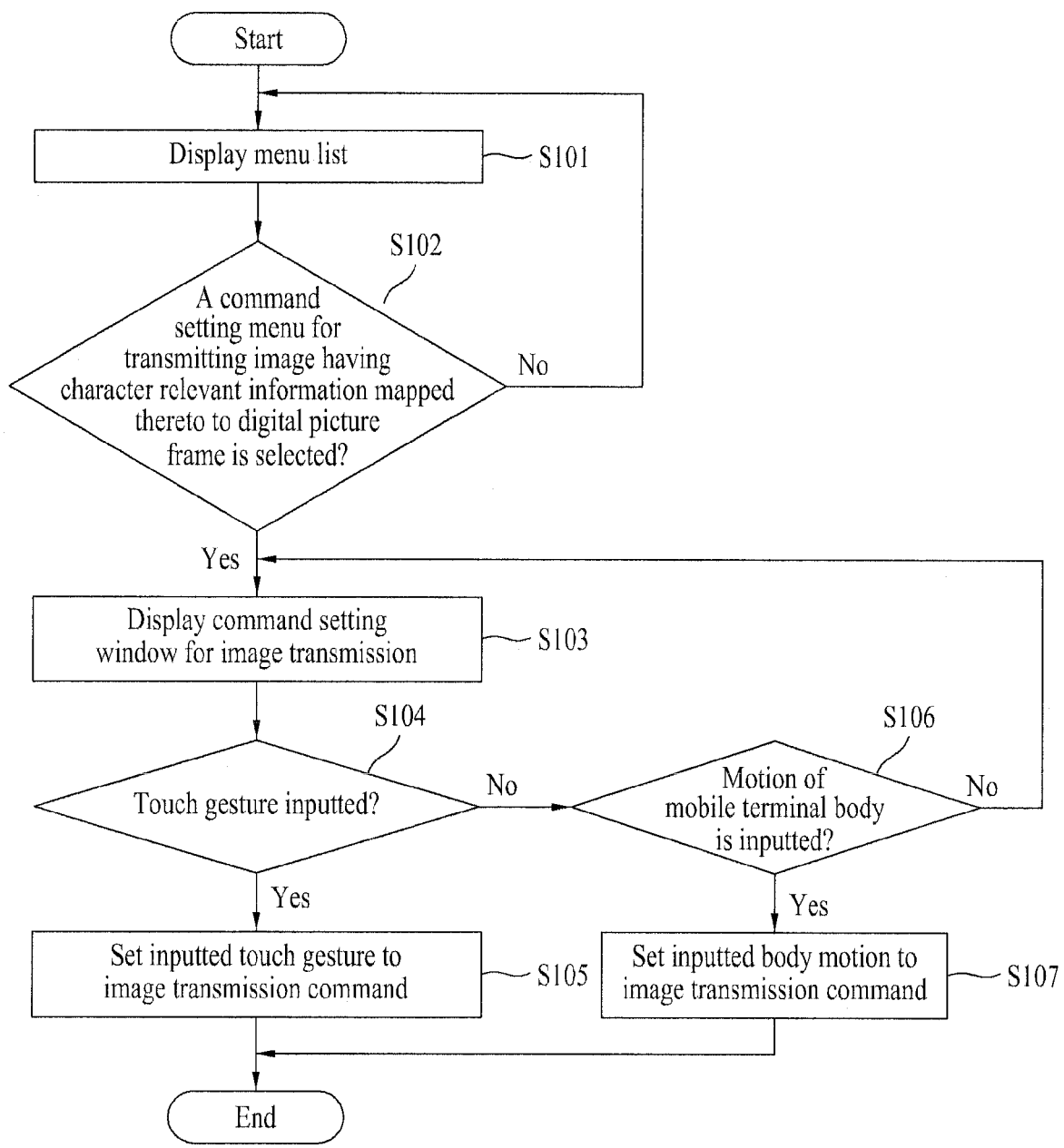
FIG. 29 is a diagram of one embodiment of a method for setting a command for transmitting an image having character relevant information mapped thereto to a digital picture frame.
Figure 30:
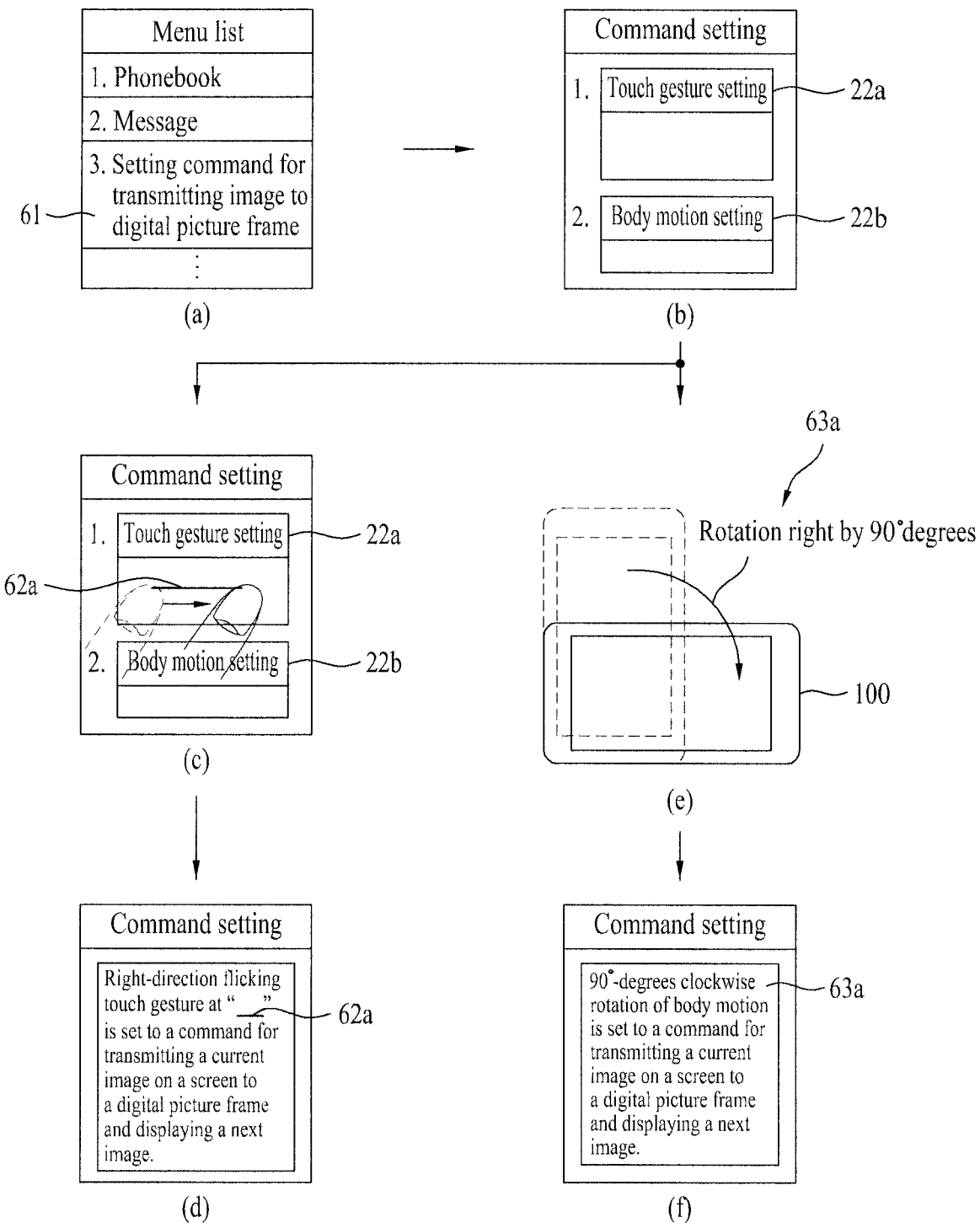
FIGS. 30 to 32 are diagrams of screens relating to the method of FIG. 29.
Figure 31:
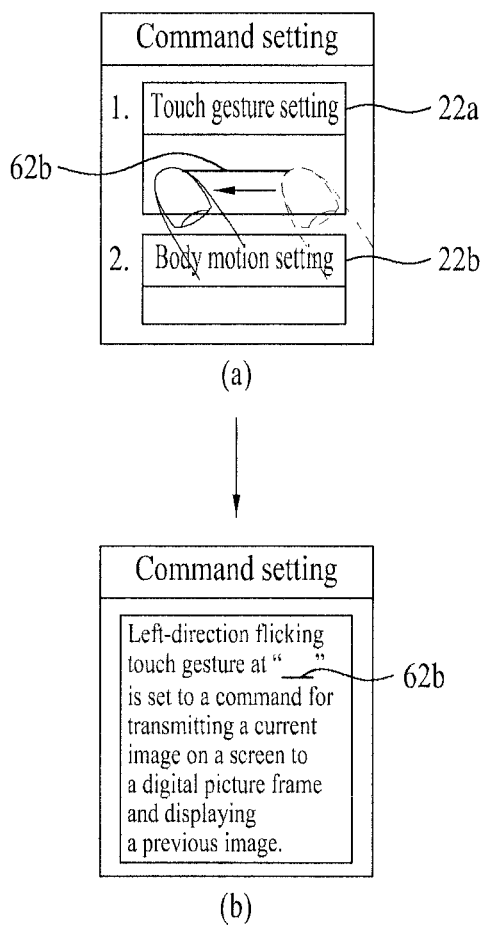
Figure 32:
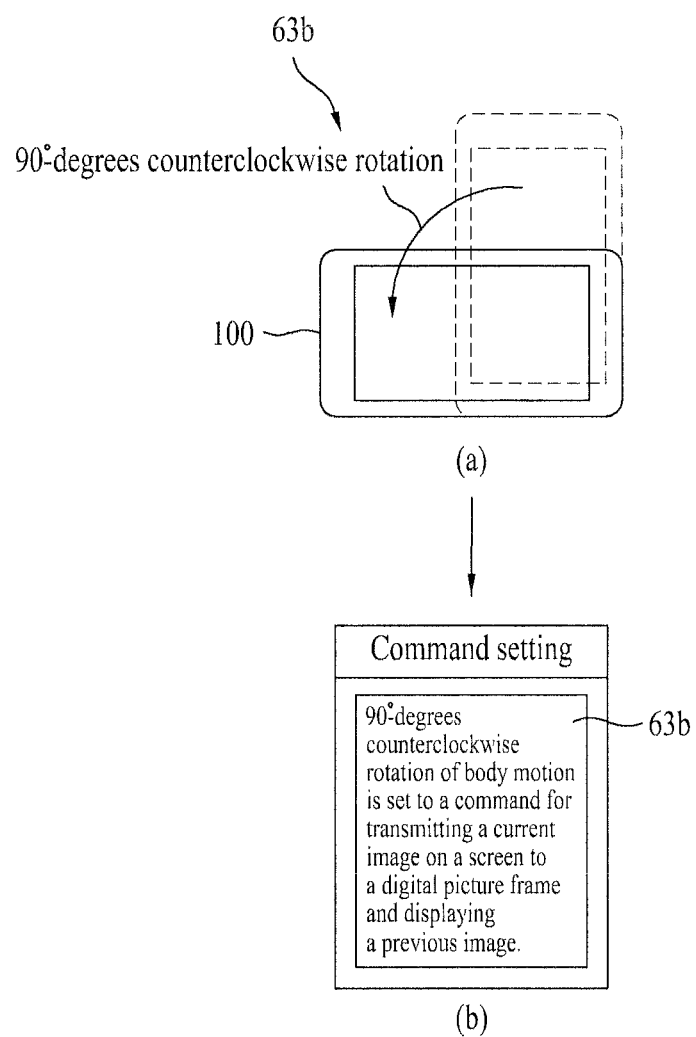

FIG. 29 shows steps included in a method for a mobile terminal to set a command for transmitting an image having character relevant information mapped thereto to a digital picture frame. FIGS. 30 to 32 show screens relating to the method of FIG. 29.

Referring to FIG. 29 and FIG. 32, a menu list is displayed on the touchscreen 151 (S101). The menu list includes a command setting menu 61 for transmitting an image to which character relevant information is mapped to the digital picture frame 200. In step S102, this menu 61 is selected as shown in FIG. 30(a). The controller 180 of the mobile terminal 100 then displays a command setting window for setting the command on a screen of the touchscreen 151 (S103) as shown in FIG. 30 (b).

A command for establishing a connection between the mobile terminal 100 and digital picture frame 200 may be given by the mobile terminal 100 in two ways. Referring to FIG. 30 (b), the command can be set based on a user's touch gesture or based on a motion of the body of the mobile terminal 100.

The command setting window shown in FIG. 30 (b) includes a touch gesture setting window 22a and a body motion setting window 22b. If a user touches touch gesture setting window 22a, controller 180 activates the touch gesture setting window 22a and then detects or monitors whether a user's touch gesture is input to touch gesture setting window 22a.

If a flicking touch gesture 62a is input in left-to-right direction by a user via touch gesture setting window 22a (S104) as shown in FIG. 30 (c), controller 180 recognizes the inputted touch gesture 62a as a command for transmitting the image 51a and displaying an image next to the former image 51a, maps the touch gesture 62a to the operation of transmitting the image 51a and the operation of displaying the next image, and then stores them in the memory 160 (S105) as shown in FIG. 30 (d).

If a flicking touch gesture 62b is input in right-to-left direction by a user via the touch gesture setting window 22a as shown in FIG. 31 (a), controller 180 recognizes the inputted touch gesture 62b as a command for transmitting the image 51a and displaying an image previous to the former image 51a, maps the touch gesture 62b to the operation of transmitting the image 51a and the operation of displaying the previous image, and then stores them in the memory 160 as shown in FIG. 31 (b). In this case, each of the touch gestures 62a and 62b may include a contact touch and a proximity touch.

If the body motion setting window 22b is touched by a user, controller 180 activates acceleration sensor 142 and then uses acceleration sensor 142 to detect or monitor whether a motion of the body of the mobile terminal 100 is input.

If a first motion 63a of the body of the mobile terminal 100 is input by the user via acceleration sensor 142 (S106) as shown in FIG. 30 (e), controller 180 recognizes the input first motion 63a as a command for transmitting the image 51a and displaying an image next to former image 51a, maps the first motion 63a to the operation of transmitting the image 51a to the operation of displaying the next image, and then stores them in the memory 160 (S107) as shown in FIG. 30 (f).

If a second motion 63b of the body of the mobile terminal 100 is input by the user via the acceleration sensor 142 as shown in FIG. 32 (a), controller 180 recognizes the input second motion 63b as a command for transmitting the image 51a and displaying an image previous to the former image 51a, maps the second motion 63b to the operation of transmitting the image 51a and the operation of displaying the previous image, and then stores them in the memory 160 as shown in FIG. 32 (b).

In the following description, a process for transmitting the image 51a, to which information 53 relevant to the specific character 52 is mapped, to the digital picture frame 200 using the touch gesture 62a or 62b or the body motion 63a or 63b set in the process shown in FIGS. 27 to 32 is explained in detail with reference to FIGS. 33 to 38.

Figure 33:
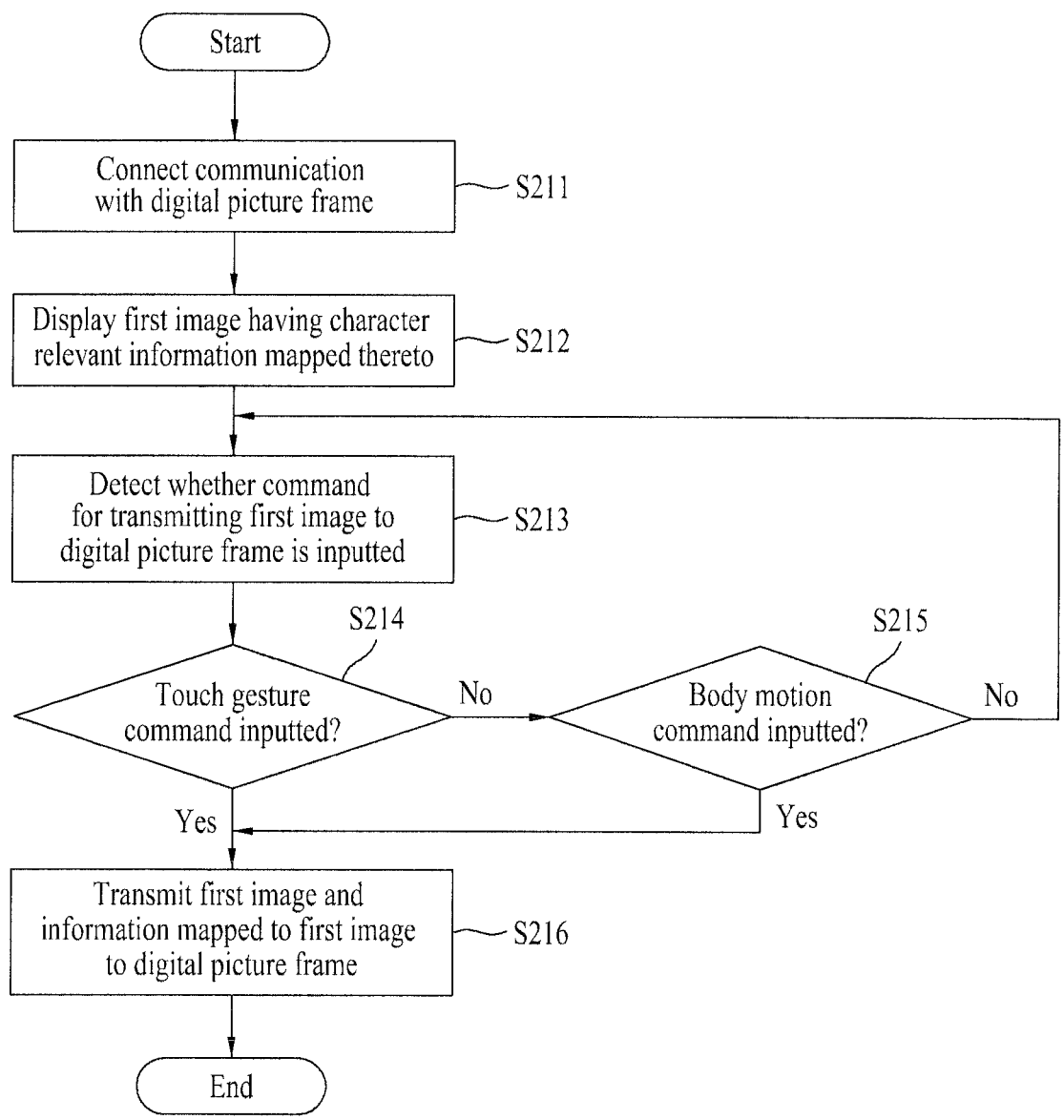
FIG. 33 is a diagram relating to another embodiment of a method for transmitting an image having specific character relevant information mapped thereto to a digital picture frame.

FIG. 33 shows steps in one embodiment of a method for transmitting an image having specific character relevant information mapped thereto to a digital picture frame based on a touch gesture or a body motion. FIGS. 34 to 38 show screens relating to the method of FIG. 33.

While a short-range communication connection exists between digital picture frame 200 and the mobile terminal (S211), if a first image having information relevant to a specific character is selected from the memory 160 by a user, controller 180 of the mobile terminal 100 displays the selected first image on the touchscreen (S212).

The controller 180 then detects or monitors whether a touch gesture or body motion command for transmitting the first image to the digital picture frame 200 is input by the user via the touchscreen 151 or the acceleration sensor 142 (S213).

If a touch gesture for transmitting the first image is input to the touchscreen 151 (S214) or a body motion for transmitting the first image is input via the acceleration sensor 142 (S215), controller 180 transmits the first image and information relevant to the character within the first image to the digital picture frame 200 (S216).

Information relevant to the character may include, for example, contact information of the character and display position information of the character within the first image. Moreover, an indicator indicating that the information is mapped to the first image can be included in the first image.

Figure 34:
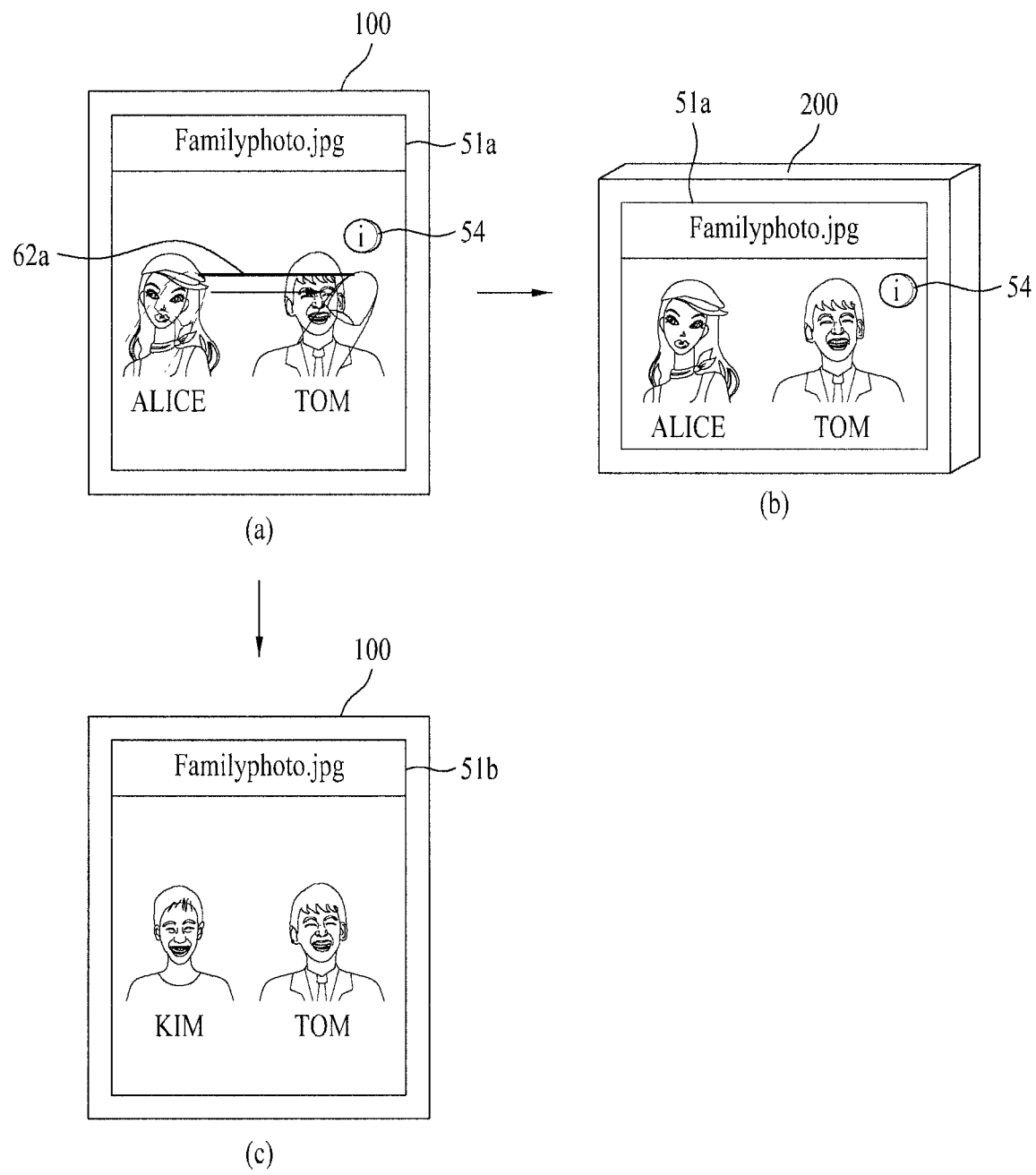
FIGS. 34 to 38 are diagrams of screens relating to the method of FIG. 33.

FIG. 34(a) shows that a first image 51a having characters 'ALICE' and 'TOM' included therein is displayed on the touchscreen 151 while a short-range connection is established between the mobile terminal 100 and digital picture frame 200. In particular, FIG. 34 (a) shows that indicator 54 indicating that information relevant to the character TOM is mapped is displayed within the first image 51a.

While the first image 51a is displayed on the touchscreen 151, if a touch gesture 62a for commanding transmission of the first image 51a to the digital picture frame 200 and commanding display of a second image 51b next to the first image 51a is input by a user as shown in FIG. 34 (a), controller 180 transmits the first image 51a and the information relevant to the character TOM within the first image 51a to the digital picture frame 200 as shown in FIG. 34 (b).

Once the first image 51a is transmitted to the digital picture frame 200 as shown in FIG. 34 (c), controller 180 displays the second image 51b following the first image 51a on the touchscreen 151.

Figure 35:
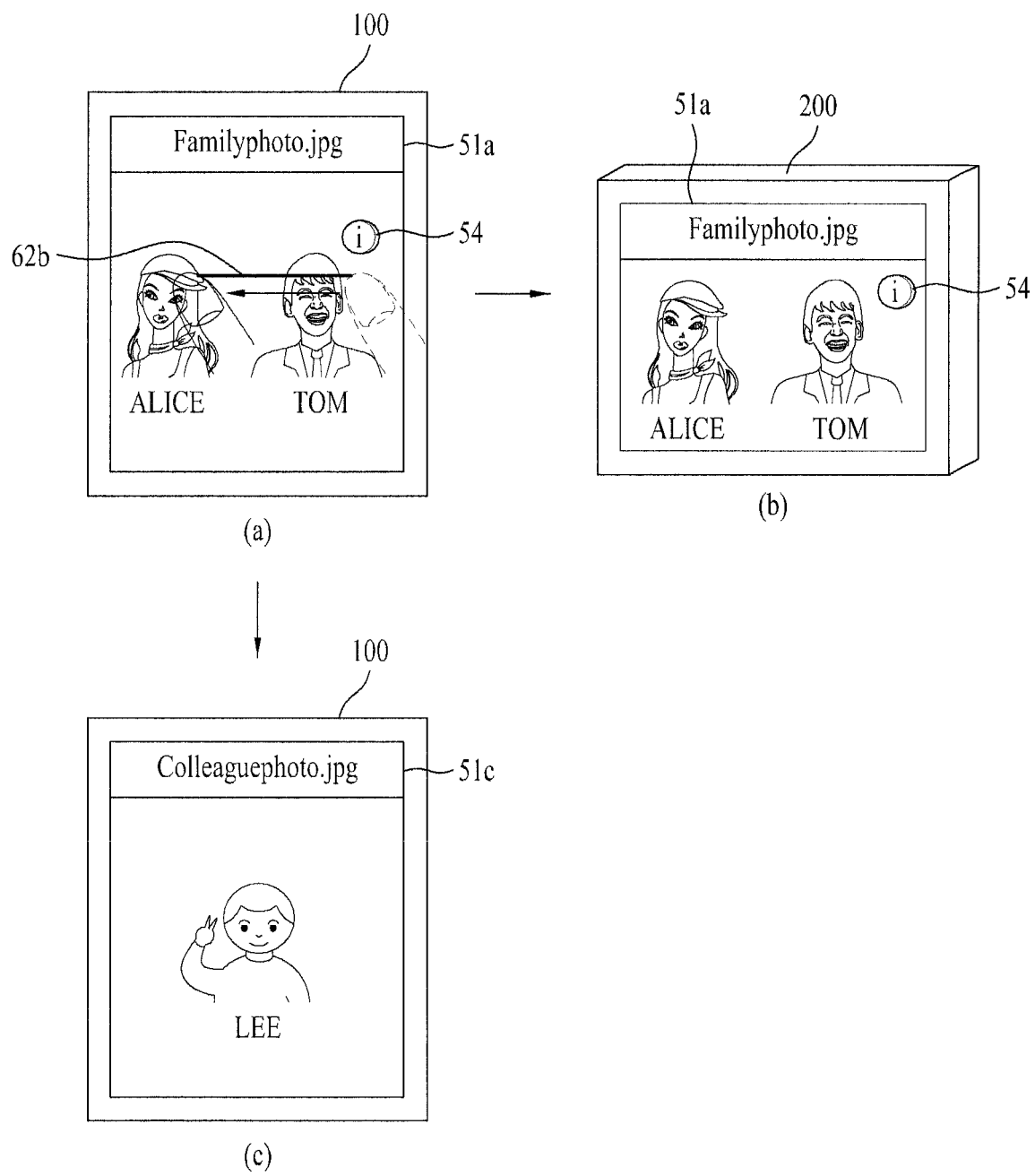

While the first image 51a is displayed on the touchscreen 151, if a touch gesture 62b for commanding transmission of first image 51a to the digital picture frame 200 and commanding display of a third image 51c previous to the first image 51a is input by a user as shown in FIG. 35 (a), controller 180 transmits first image 51a and the information relevant to the character TOM within the first image 51a to the digital picture frame 200 as shown in FIG. 35 (b).

Once the first image 51a is transmitted to the digital picture frame 200, as shown in FIG. 35 (c), the controller 180 displays the third image 51c previous to the first image 51a on the touchscreen 151.

Figure 36:
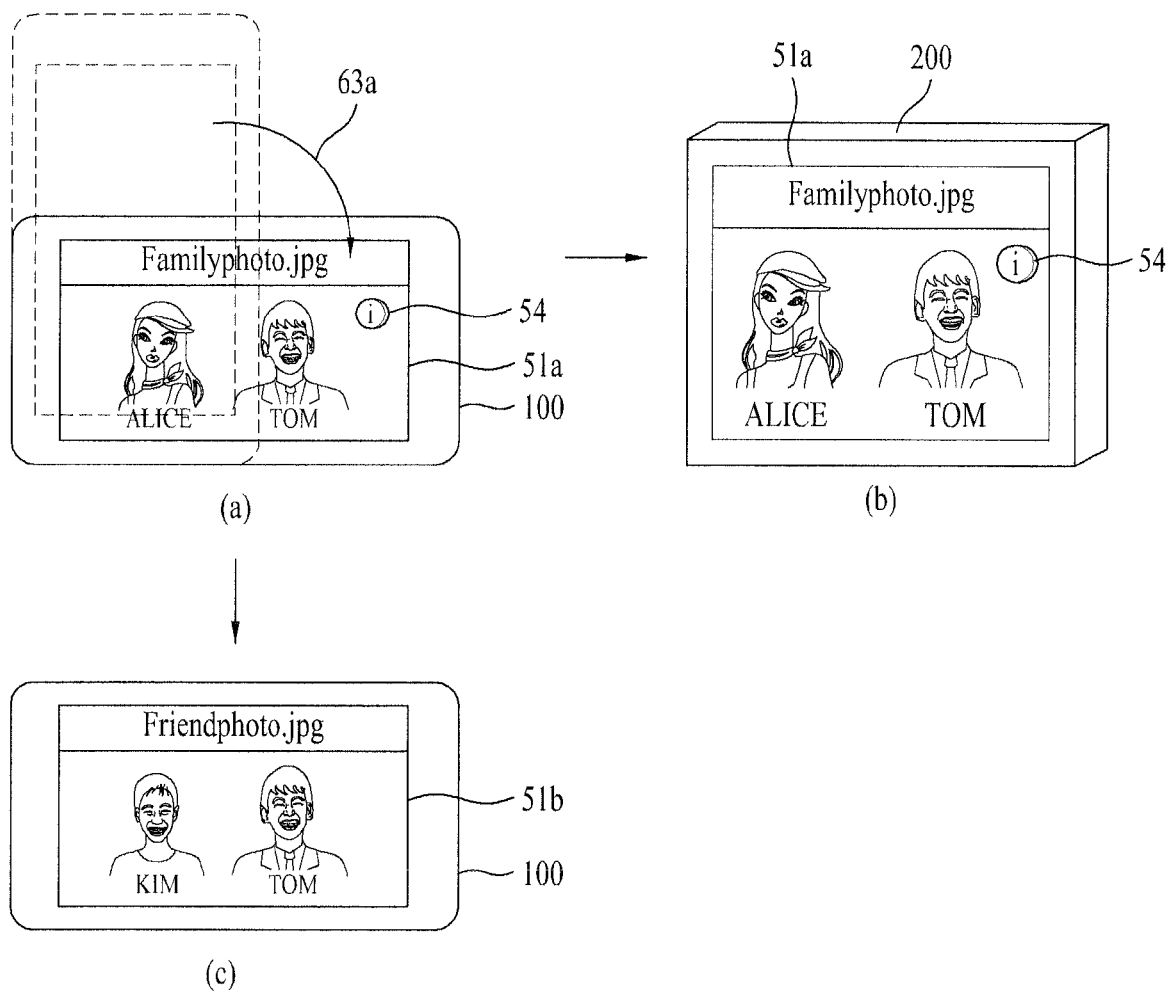

While the first image 51a is displayed on the touchscreen 151, if a first motion 63 of the body for commanding a transmission of the first image 51a to the digital picture frame 200 and commanding a display of a second image 51b next to the first image 51a is detected via the acceleration sensor 142 as shown in FIG. 36 (a), controller 180 transmits the first image 51a and the information relevant to the character TOM within the first image 51a to the digital picture frame 200 as shown in FIG. 36 (b).

Once the first image 51a is transmitted to the digital picture frame 200 as shown in FIG. 36 (c), controller 180 displays the second image 51b following the first image 51a on the touchscreen 151.

Figure 37:
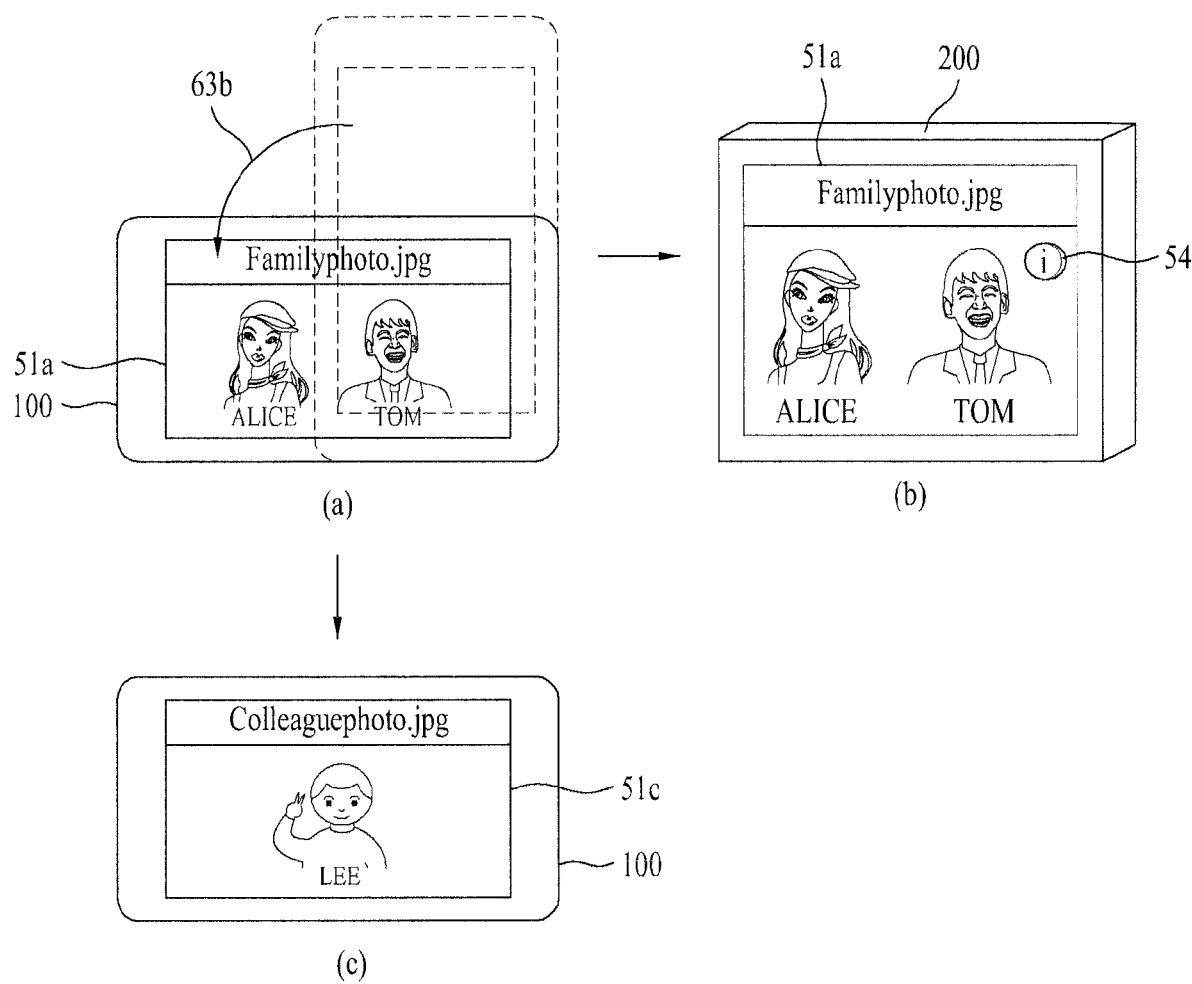

While the first image 51a is displayed on the touchscreen 151, if a first motion 63a of the body for commanding a transmission of the first image 51a to the digital picture frame 200 and commanding a display of a third image 51c previous to the first image 51a is detected via the acceleration sensor 142 as shown in FIG. 37 (a), controller 180 transmits the first image 51a and the information relevant to the character TOM within the first image 51a to the digital picture frame 200 as shown in FIG. 37 (b).

Once the first image 51a is transmitted to the digital picture frame 200 as shown in FIG. 37(c), controller 180 displays the third image 51c previous to the first image 51a on the touchscreen 151.

Figure 38:
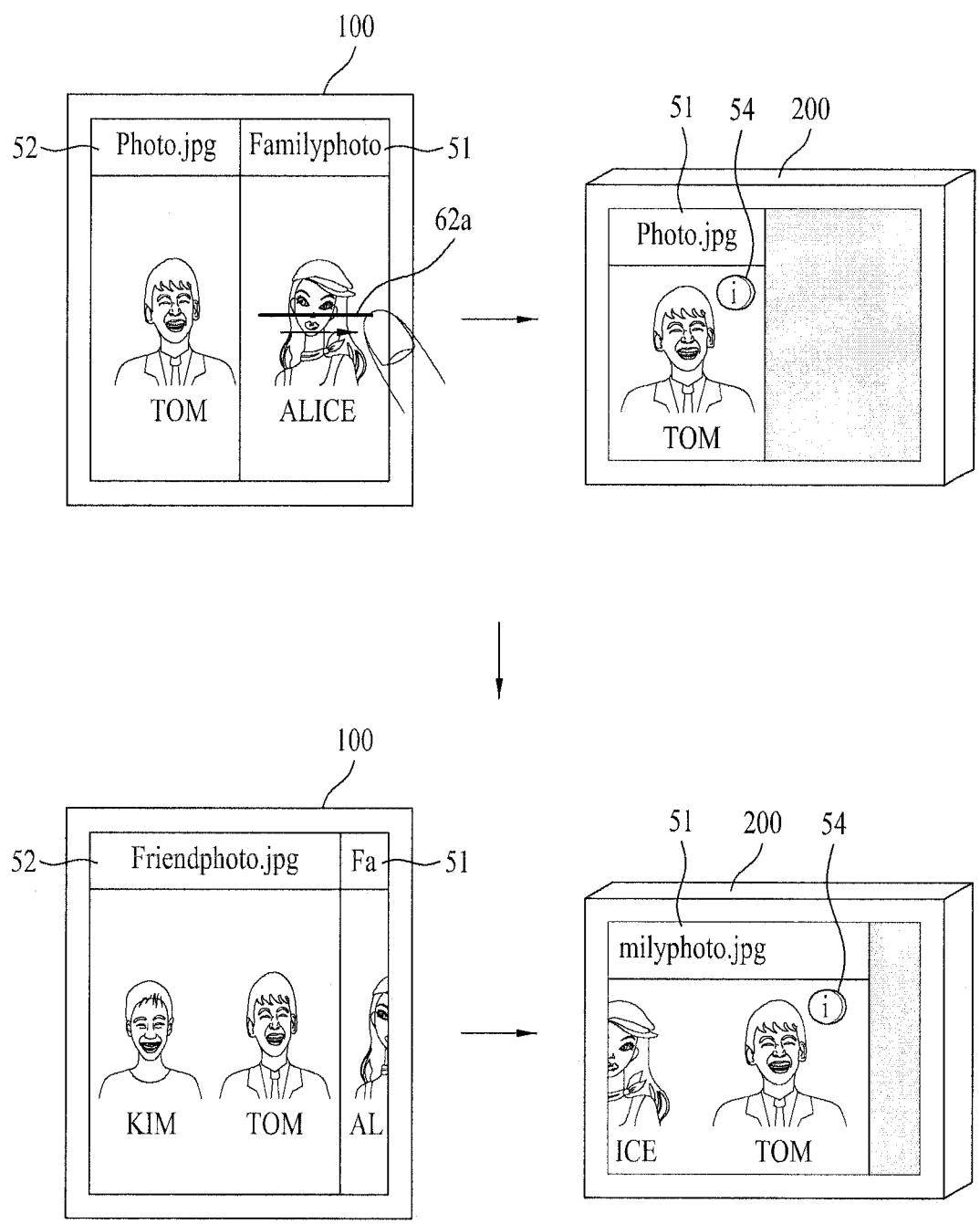

Referring to FIG. 38, while the first image 51a including the characters ALICE and TOM is displayed on the touchscreen 151, if a left-to-right flicking touch 62a is input by a user, controller 180 displays the first image 51a to correspond to the flicking touch 62a in a manner that the first image 51a sequentially disappears from a left direction of the screen of the touchscreen 151 to a right direction and enables a next image 51b following the first image 51a to be displayed on the spot from which the first image 51a has disappeared.

The controller 180 may sequentially transmit the part of the first image 51a disappearing from the screen of the touchscreen 151 to the digital picture frame 200 so that the transmitted first image 51 can be sequentially displayed on the screen of the display unit 250 of the digital picture frame 200 in left-to-right direction.

Figure 39:
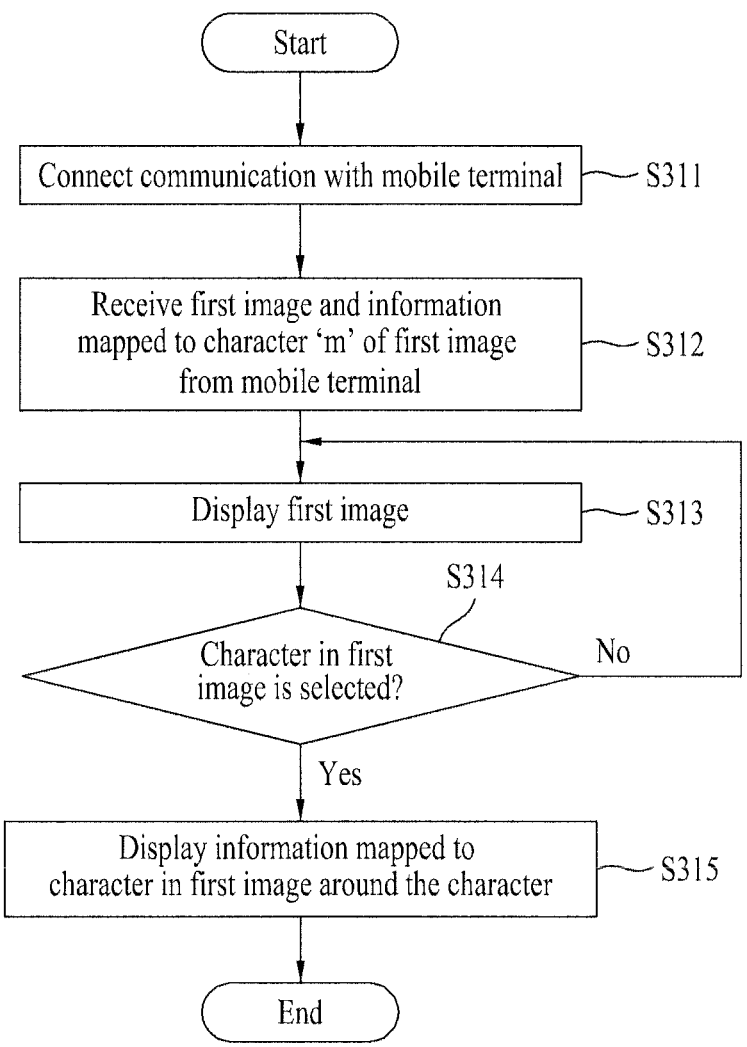
FIG. 39 is a diagram showing steps included in one embodiment of a method for displaying an image and related mapped information on a digital picture frame received from a mobile terminal.
Figure 40:
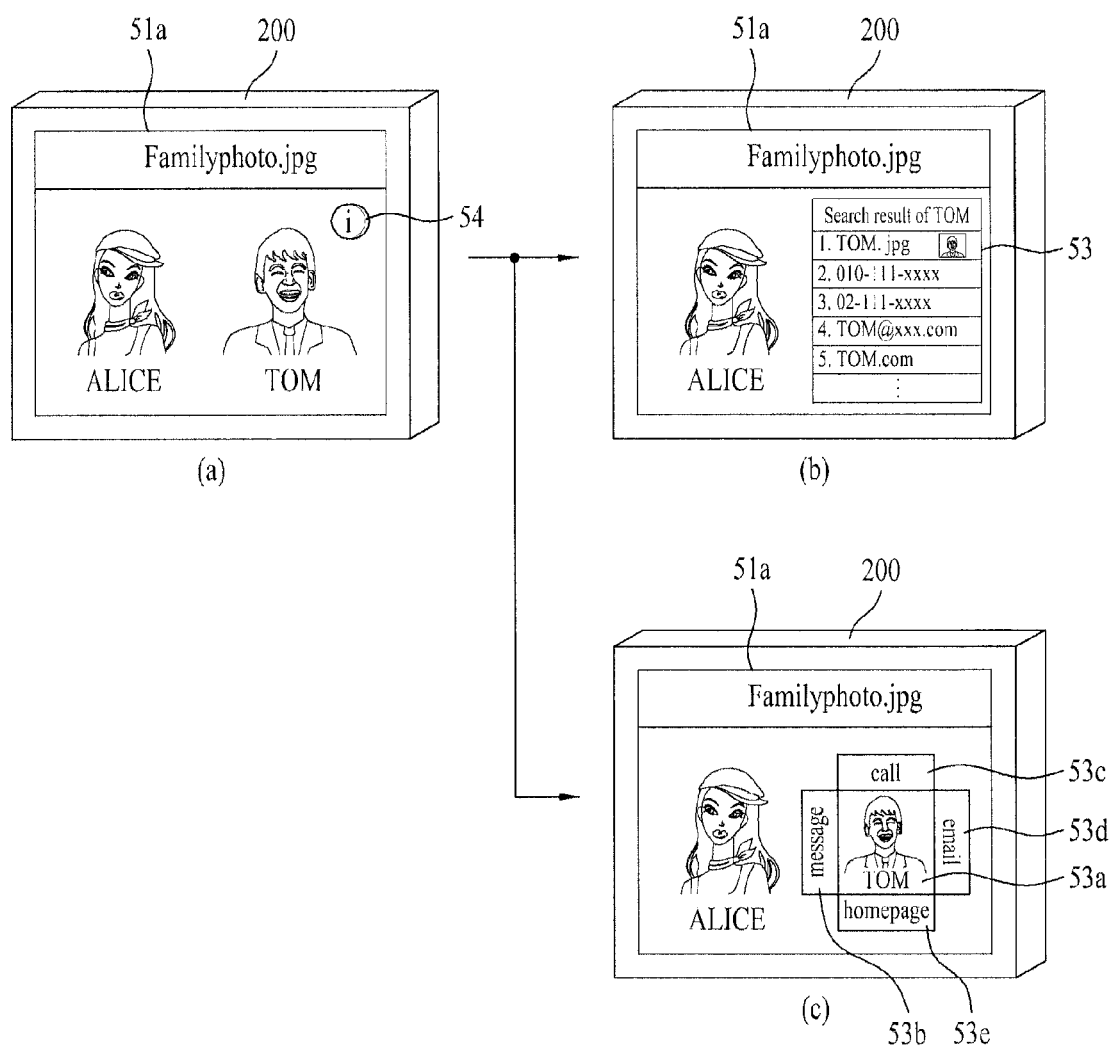
FIG. 40 is a diagram of screens relating to the method of FIG. 39.

FIG. 39 shows steps included in one embodiment of a method for a digital picture frame to display an image received from a mobile terminal and information mapped to the image. FIG. 40 shows a screen relating to the method of FIG. 39.

A short-range connection is established with the mobile terminal 100 via the wireless communication unit 210 (S311). An image 51a and information 53 relevant to a specific character TOM and an indicator 54 to which image 51a is mapped are received from the mobile terminal 100 (S312). The control unit 260 of the digital picture frame 200 then displays the received image 51a on the screen of the display unit 250 (S313) as shown in FIG. 40 (a).

Referring to FIG. 40 (a), control unit 260 obtains a display position of the character TOM within the image 51a by referring to the display position information of the character TOM included in the information 53 and is then able to display the indicator 54 at the obtained display position of the character TOM. In particular, a user of the digital picture frame 200 can be aware that the information 53 relevant to the character TOM is mapped to the image 51a displayed on the screen via the indicator 54.

If the character TOM of image 51a is selected (S314), control unit 260 displays the information 53 relevant to the character TOM adjacent, near, or around the display position of the character TOM within the image 51a (S315).

FIG. 40(b) shows that contact information 53 relevant to TOM is displayed as a list, and FIG. 40(c) shows that each content information 53 relevant to TOM is arranged as an icon around the image 53a of TOM.

Referring to FIG. 40(c), if a 'message' icon 53b is selected from the contact information 53 by a user, control unit 260 may transmit a command signal to display a message writing window for writing a message to send to the character TOM via the wireless communication unit 210. In case of receiving the message writing window display command signal from the digital picture frame 200, the mobile terminal 100 is able to change a current picture into a message writing picture.

Referring to FIG. 40(c), if a 'call' icon 53c is selected from the contact information 53 by a user, control unit 260 may transmit a command signal for a call connection to an external terminal corresponding to the character TOM via the wireless communication unit 210. In case of receiving the call connection command signal from the digital picture frame 200, the mobile terminal 100 is able to connect a call to the external terminal corresponding to the character TOM by controlling the wireless communication unit 110.

Referring to FIG. 40(c), if an 'email' icon 53d is selected from the contact information 53 by a user, control unit 260 is able to transmit a command signal to display an email writing window for writing a message to send to the character TOM via the wireless communication unit 210. In case of receiving the email writing window display command signal from the digital picture frame 200, the mobile terminal 100 is able to change a current picture into an email writing picture.

Referring to FIG. 40(c), if a 'homepage' icon 53e is selected from the contact information 53 by a user, control unit 260 is able to transmit a command signal for access to the character TOM via the wireless communication unit 210. In case of receiving the homepage access command signal from the digital picture frame 200, the mobile terminal 100 is able to access the homepage of the character TOM by controlling the wireless communication unit 110.

Fifth Embodiment

In a fifth embodiment, while an image received from the mobile terminal 100 and information relevant to a character within the image are displayed on the digital picture frame 200, if a call is received from the character, the mobile terminal 100 transmits an indicator, which indicates that the call is received from the character, to the digital picture frame 200. Therefore, the fifth embodiment provides a function for the digital picture frame 200 to inform a user that the call has been received from the character.

Figure 41:
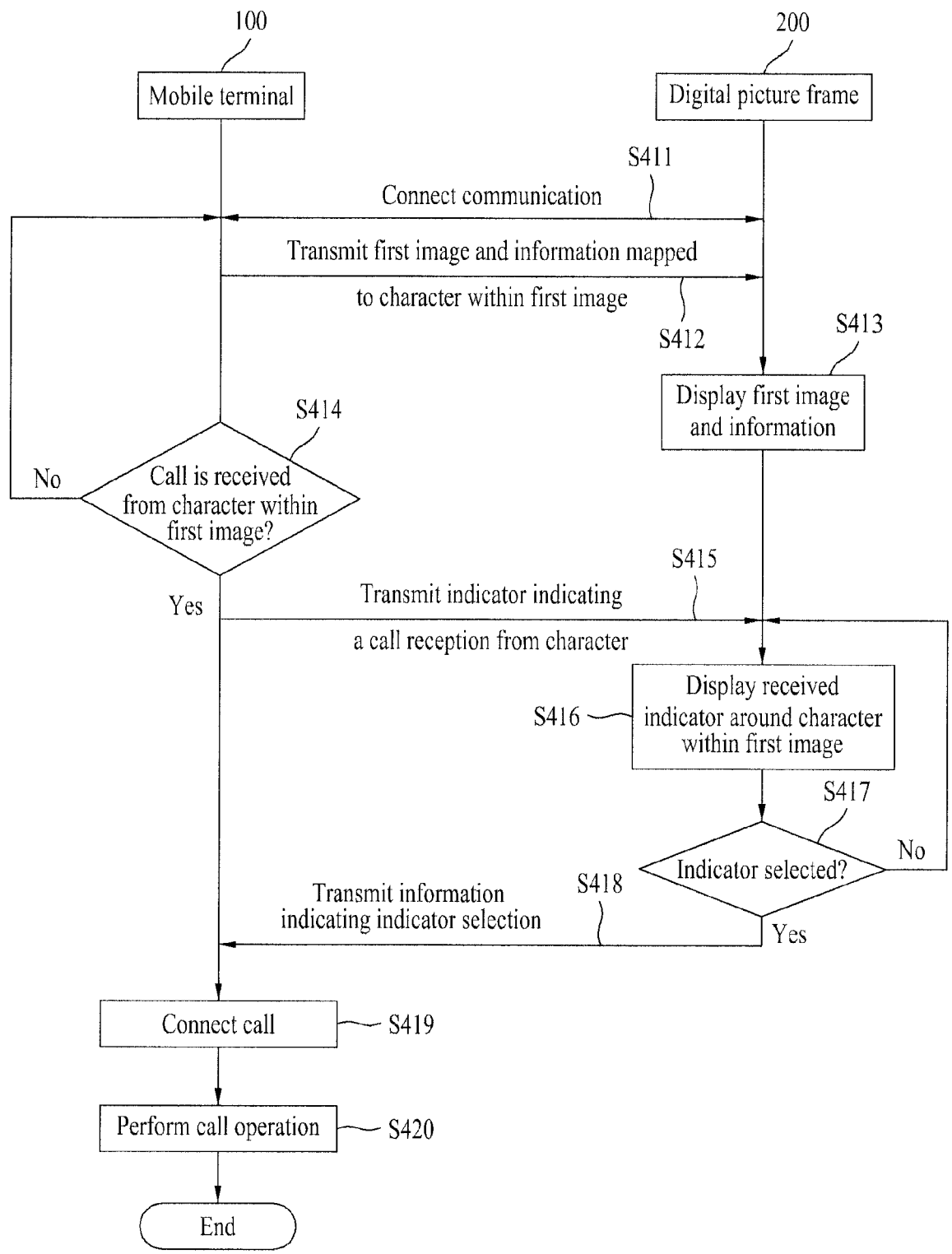
FIG. 41 is a signaling flowchart relating to a process that may be used to inform a digital picture frame that a call is received from a character within an image displayed on the digital picture frame.
Figure 42:
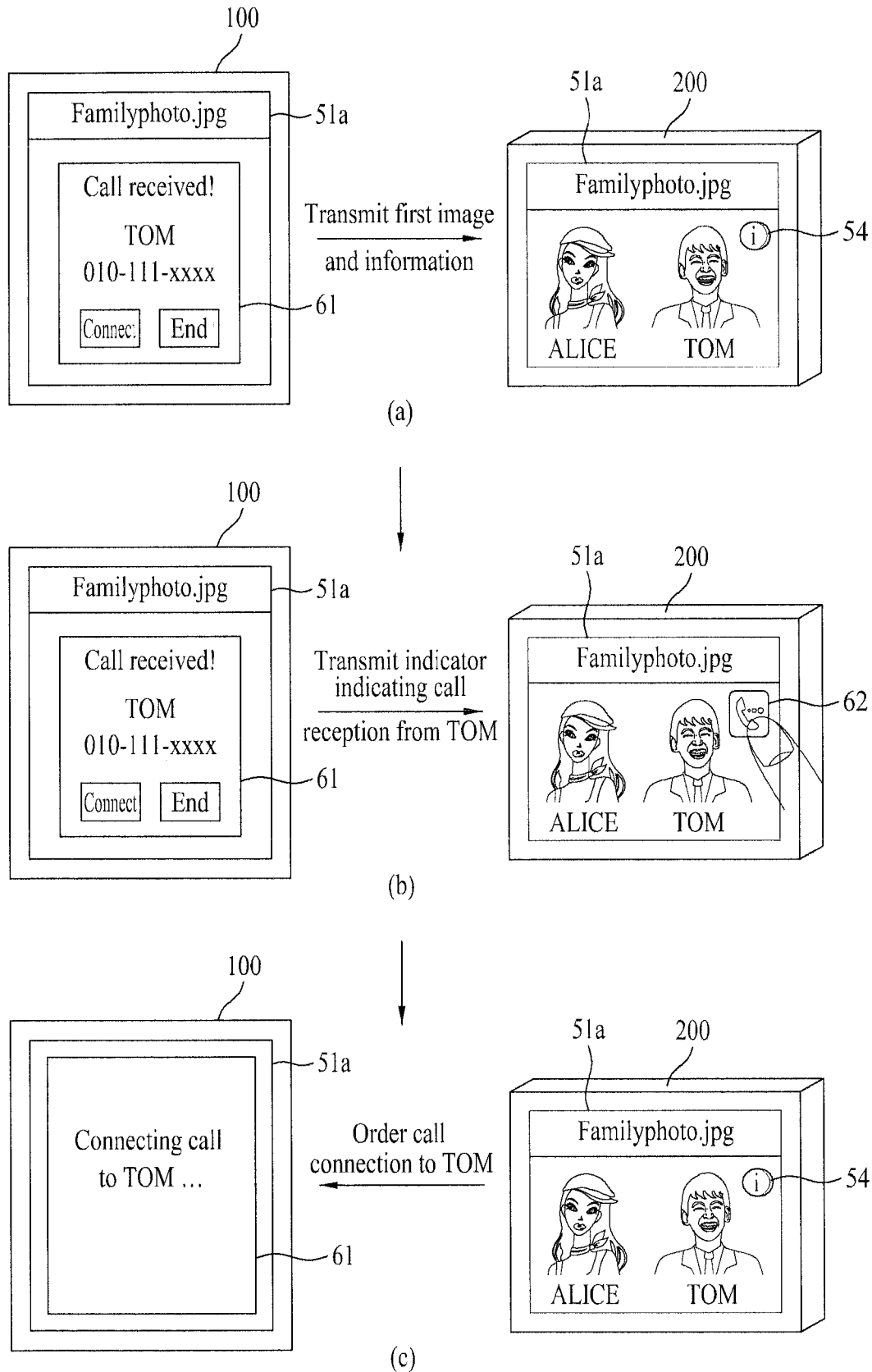
FIG. 42 is a diagram showing screens relating to the flowchart of FIG. 41.

FIG. 41 shows a signaling flowchart corresponding to a process for a mobile terminal to inform a digital picture frame that a call is received from a character within an image displayed on the digital picture frame. FIG. 42 shows screens relating to the method of FIG. 41.

A short-range connection is established between the mobile terminal 100 and the digital picture frame 200 (S411). If the mobile terminal 100 transmits an image 51a displayed on the screen of the touchscreen 151 and information 53 mapped to the image 51a to the digital picture frame 200 (S412), the digital picture frame 200 displays the image 51a and the information 53 mapped to the image 51a received from the mobile terminal 100 (S413) as shown in FIG. 42 (a).

If a call 61 is received from an external terminal corresponding to a specific character TOM within the image 51a transmitted to the digital picture frame 200 (S414) as shown in FIG. 42 (a), the mobile terminal 100 transmits an indicator 62, which indicates that the call is received from the external terminal corresponding to the character TOM, to the digital picture frame 200 (S415) as shown in FIG. 42 (b).

That is, while communication with the digital picture frame 200 is established, if the mobile terminal 100 receives a call from an external terminal, mobile terminal 100 obtains whether phone number information identical to a phone number of the external terminal exists in the information 53 having been transmitted to the digital picture frame 200.

If a phone number information identical to a phone number of the external terminal exists in the information 53 having been transmitted to the digital picture frame 200, the mobile terminal 100 determines an owner of the external terminal as TOM and then transmits the indicator 62, which indicates that the call is received from TOM, to the digital picture frame 200.

The digital picture frame 200 displays the indicator 62 received from the mobile terminal 100 around a display position of TOM within the image 51a (S416). If a user selects indicator 62 (S417) as shown in FIG. 42 (b), the digital picture frame 200 transmits information, which indicates the selection of the indicator 62, to the mobile terminal (S418) as shown in FIG. 42 (c).

In case of receiving the information indicating the selection of the indicator 62 from the digital picture frame 200, the mobile terminal 100 determines that a connection of the currently received call 61 is ordered. Subsequently, the mobile terminal 100 performs the connection of the call to the external terminal corresponding to the character TOM (S419) and also performs an operation related to the call (S420). A conversation can then begin. According to one embodiment, the conversation can be performed through a speakerphone function of the mobile terminal 100, a speaker connection in the digital picture frame, or through another transceiver circuit.

Sixth Embodiment

In a sixth embodiment, while an image received from the mobile terminal 100 and information relevant to a character within the image are displayed on the digital picture frame 200, if a message is received from the character, the mobile terminal 100 transmits an indicator, which indicates that the message is received from the character, to the digital picture frame 200. Therefore, the sixth embodiment provides a function for the digital picture frame 200 to inform a user that a call or other form of communication (e-mail, text message, voice message, etc.) has been received from the character.

Figure 43:
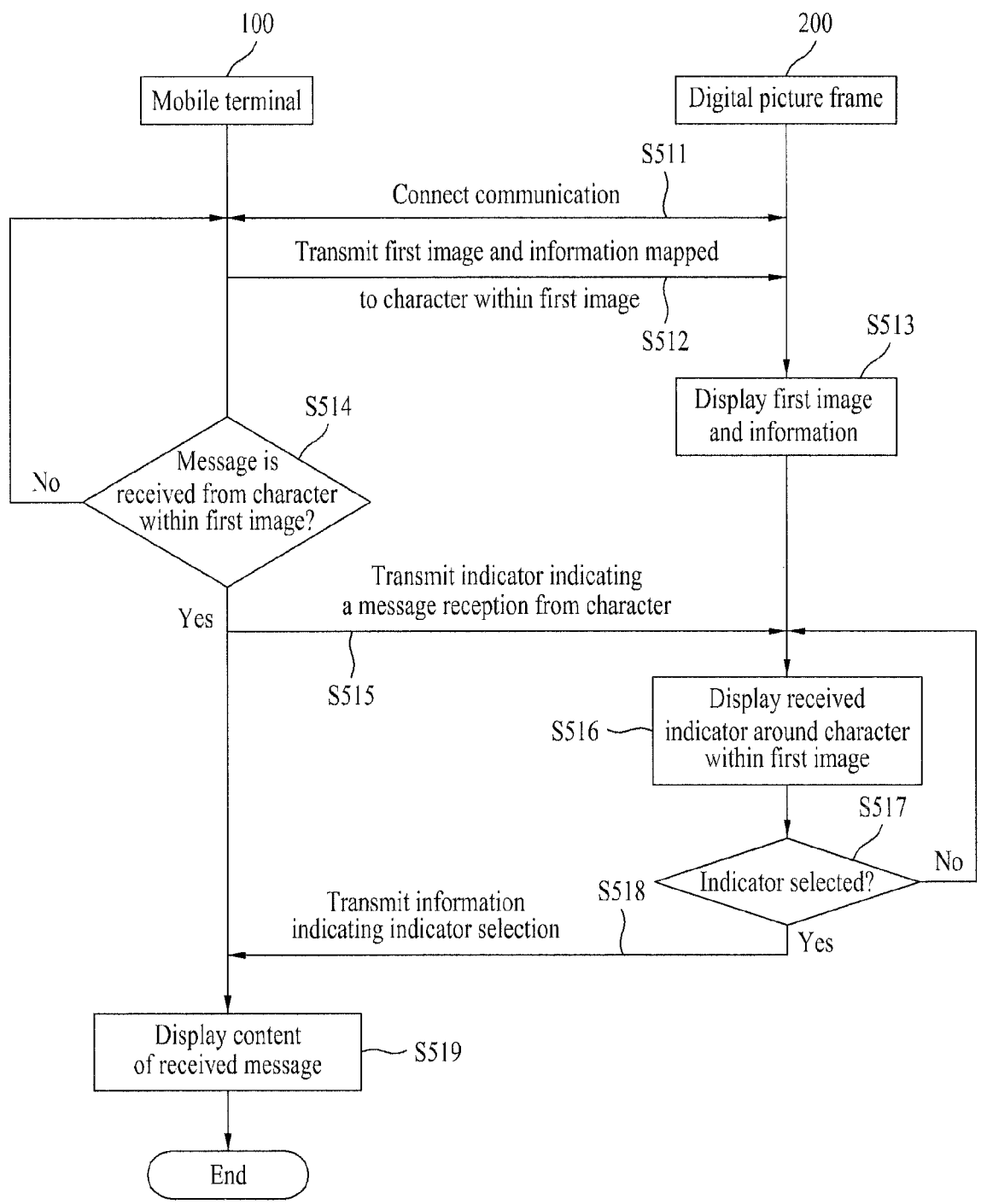
FIG. 43 is a signaling flowchart relating to a process that may be used to inform a digital picture frame that a message is received from a character within an image displayed on the digital picture frame.
Figure 44:
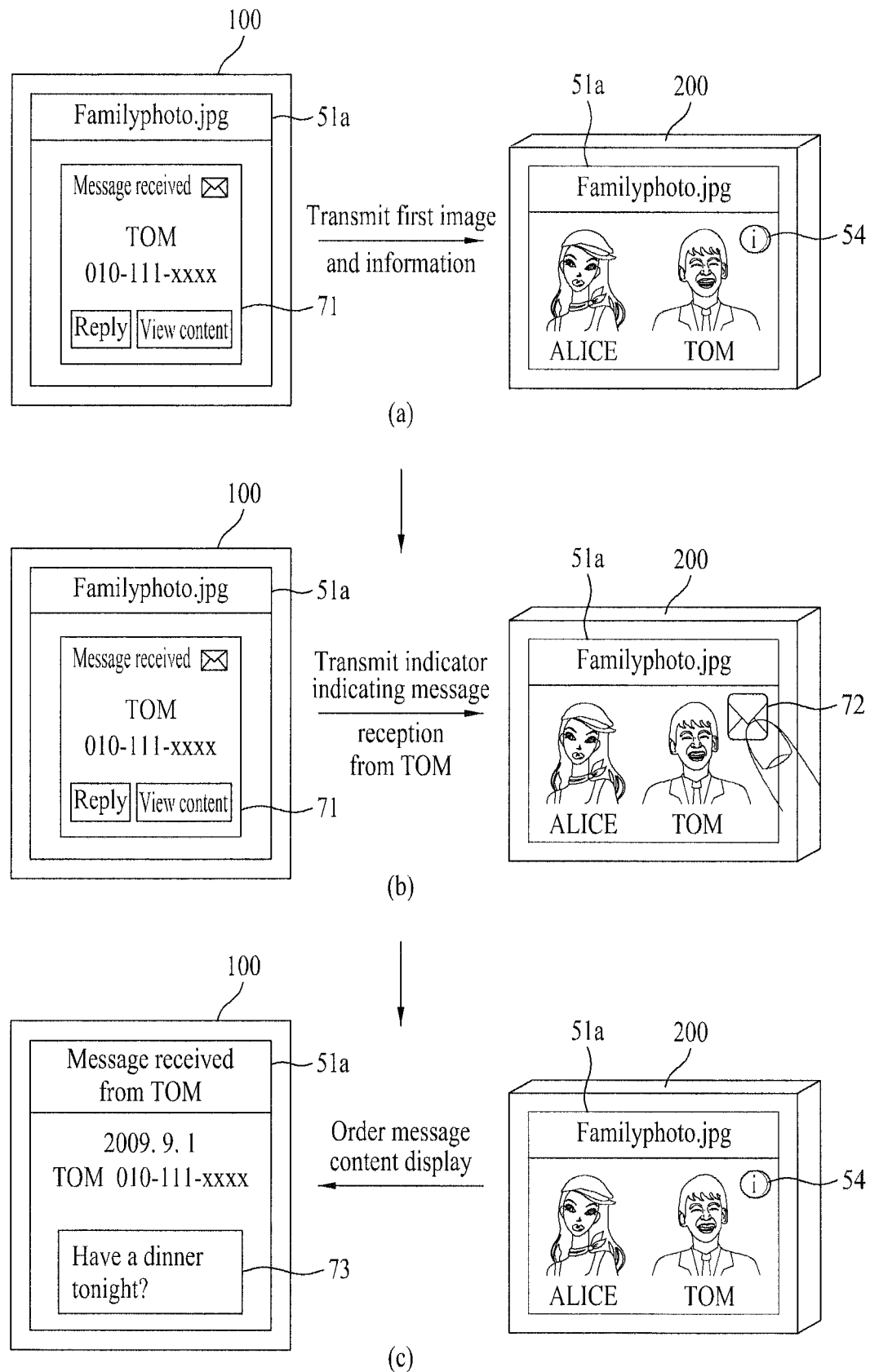
FIG. 44 is a diagram of screens relating to the flowchart of FIG. 43.

FIG. 43 shows a signaling flowchart of a process for a mobile terminal to inform a digital picture frame that a message has been received from a character within an image displayed on the digital picture frame. FIG. 44 shows screens related to the method of FIG. 43.

Initially, a short-range connection is established between the mobile terminal 100 and the digital picture frame 200 (S511). If the mobile terminal 100 transmits an image 51a displayed on the screen of the touchscreen 151 and information 53 mapped to the image 51a to the digital picture frame 200 (S512), the digital picture frame 200 displays the image 51a and the information 53 mapped to the image 51a received from the mobile terminal 100 (S513) as shown in FIG. 44 (a).

If a message 71 is received from an external terminal corresponding to a specific character TOM within the image 51a transmitted to the digital picture frame 200 (S514) as shown in FIG. 44 (a), the mobile terminal 100 transmits an indicator 72, which indicates that the message has been received from the external terminal corresponding to the character TOM, to the digital picture frame 200 (S515) as shown in FIG. 44 (b).

In particular, while the communication with the digital picture frame 200 is connected, if the mobile terminal 100 receives the message from the external terminal, the mobile terminal 100 determines whether phone number information identical to a phone number of the external terminal exists in the information 53 having been transmitted to the digital picture frame 200.

If phone number information identical to a phone number of the external terminal exists in the information 53 having been transmitted to the digital picture frame 200, the mobile terminal 100 determines an owner of the external terminal as TOM and then transmits the indicator 72, which indicates that the message has been received from TOM, to the digital picture frame 200.

The digital picture frame 200 displays the indicator 72 received from the mobile terminal 100 around a display position of TOM within the image 51a (S516). If a user selects the indicator 72 (S517) as shown in FIG. 44 (b), the digital picture frame 200 transmits information, which indicates the selection of the indicator 72, to the mobile terminal (S518) as shown in FIG. 44 (c).

In case of receiving the information indicating the selection of the indicator 72 from the digital picture frame 200, the mobile terminal 100 determines that display of content of the currently received message 71 is ordered. Subsequently, the mobile terminal 100 displays the content of the message 71 received from the external terminal corresponding to the character TOM (S519).

One or more embodiments described herein may therefore achieve one or more of the following advantages. First, to facilitate a user to establish a connection between a mobile terminal and a digital picture frame.

Second, to establish such a connection in a convenient way such as, for example, based on a touch gesture or a body motion of the mobile terminal.

Third, to facilitate content displayed on a mobile terminal to be transmitted and displayed on a digital picture frame.

Fourth, to facilitate the display of such content based on a touch gesture or a body motion of the mobile terminal.

Fifth, to establish a connection or disconnect communications between a mobile terminal and a digital picture frame based on one or more conditions, to thereby preventing unnecessary power consumption.

Sixth, to transmit information relevant to a character within an image to a digital picture frame from a mobile terminal and to do so in a manner of being attached to the image, whereby a user is informed of the information relevant to the character within the image currently displayed on the digital picture frame.

Seventh, while an image having a specific character included therein is displayed on a digital picture frame, if a mobile terminal receives a call from a character displayed within the digital picture frame, an event of a reception of the call is indicated around the character within the digital picture frame. Therefore, a user is made aware that the call has been received from the character via the digital picture frame without checking the mobile terminal.

Eighth, while an image having a specific character included therein is displayed on a digital picture frame, if a mobile terminal receives a message from a character displayed within the digital picture frame, an event of a reception of the message is indicated around the character within the digital picture frame. Therefore, a user is made aware that the message has been received from the character via the digital picture frame without checking the mobile terminal.

In addition, the foregoing embodiments can be implemented as computer-readable code stored in one of a variety of types of computer-readable media. The computer-readable media include ROM, RAM, CD-ROM, magnetic tapes, floppy discs, optical data storage devices, and the like for example and also include carrier-wave type implementations (e.g., transmission via Internet). And, the computer can include the control unit 180 of the terminal.

One or more embodiments described herein are directed to a mobile terminal, a digital picture frame, and controlling methods thereof.

One or more embodiments described herein can conveniently establish a connection between a mobile terminal and at least one digital picture frame located around the mobile terminal according to a user's touch gesture or a motion of a body of the mobile terminal.

One or more embodiments described herein transmit content displayed on the mobile terminal for display on the digital picture frame according to a user's touch gesture or a motion of a body of the mobile terminal.

One or more embodiments described herein avoid unnecessary power consumption by controlling the release of a connection between a mobile terminal and digital picture frame.

In accordance with one embodiment, a mobile terminal includes a wireless communication unit configured to perform a communication with an external digital picture frame, a memory storing a plurality of images, each having at least one character included therein, the memory storing a plurality of informations relevant to the characters in the images in a manner of being mapped to a plurality of the images, respectively, a touchscreen configured to display a first one of a plurality of the images stored in the memory, and a controller transmitting the first image and first information mapped to the first image to the digital picture frame via the wireless communication unit.

In accordance with another embodiment, a method of controlling a mobile terminal includes connecting a communication with an external digital picture frame, displaying an image including at least one character on a touchscreen, the image having information relevant to the character mapped thereto, and transmitting the image and information mapped to the image to the digital picture frame.

In accordance with another embodiment, a digital picture frame includes a wireless communication unit communicating with an external mobile terminal, the wireless communication unit receiving a first image and information mapped to a character within the first image from the mobile terminal, a touchscreen displaying the first image received via the wireless communication unit, and a control unit displaying the information mapped to the character around the character if a region having the character displayed within the first image is touched.

In accordance with another embodiment, a method of controlling a digital picture frame includes the steps of receiving a first image and information mapped to a character within the first image from a mobile terminal having a communication connected thereto, displaying the received first image, and displaying the information mapped to the character around the character if a region having the character displayed within the first image is touched in the displayed first image.

In accordance with another embodiment, a mobile terminal, comprises a wireless communication unit to establish a connection to an external digital picture frame; a memory to store (a) a plurality of images each having at least one character and (b) information mapped to the character in each of the images; a touchscreen to display a first image stored in the memory; and a controller to transmit the first image and first information mapped to the first image to the digital picture frame via the wireless communication unit.

The information mapped to the character may include at least one of contact information of the character or display position information of the character within the first image. Also, the terminal may include a sensor to detect a touch gesture, wherein the controller establishes the connection with the digital picture frame through the wireless communication unit when the touch gesture is detected by the sensor. An acceleration sensor may also be included to detect a predetermined motion of a mobile terminal body. If the predetermined motion is detected by the acceleration sensor, the controller establishes the connection with the digital picture frame by controlling the wireless communication unit.

The controller may control transmission of information indicating that the first information is mapped to the first image to the digital picture frame. If the first image displayed on the touchscreen is not changed for a predetermined time period, the controller adjusts a screen brightness of the touchscreen to a level below a preset brightness.

Additionally, if the first image displayed on the touchscreen is not changed for a predetermined time period, the controller releases the connection between the mobile terminal and digital picture frame. After the connection is released, the controller may automatically reestablish the connection with the digital picture frame when the first image is changed. Also, after the connection is released, the controller may transmit a signal to turn off power to at least a screen of the digital picture frame.

Additionally, the controller may transmit information to the digital picture frame indicating that a call has been received for the character within the first image. The controller may connect the call in response to a signal received from the digital picture frame, the signal from the digital picture frame indicating that the call is to be connected. Also, the controller may transmit information to the digital picture frame indicating that a message has been received from the character within the first image.

In accordance with another embodiment, a method of controlling a mobile terminal comprises establishing a wireless connection between a mobile terminal and an external digital picture frame; displaying an image including at least one character on a touchscreen of the mobile terminal, the image mapped to information stored in the mobile terminal; and transmitting the image and the mapped information to the digital picture frame, wherein the image and mapped information are transmitted in response to one of a preset terminal body motion or a gesture made in relation to a screen of the mobile terminal.

In accordance with another embodiment, a digital picture frame comprises a wireless communication unit to establish a connection with an external mobile terminal, the wireless communication unit receiving a first image and information mapped to the first image from the mobile terminal; a touchscreen to display the first image received through the wireless communication unit; and a controller to display the mapped information at a location on the touchscreen adjacent the character in the displayed first image when a region that includes the character is selected.

The information mapped to the character may include contact information relevant to the character and display position information of the character within the first image. When the character is touched, the controller may obtain a display position of the character based on the display position information, and the controller may display the mapped information at a location that is based on the display position.

Additionally, the controller may adjust a brightness of the touchscreen when a change has not been made to the image for a predetermined period of time. Also, the controller may transmit a signal indicating selection of mapped information displayed at a location on the touchscreen adjacent the character in the displayed first image.

In accordance with another embodiment, a method of controlling a digital picture frame comprises: receiving a first image and information mapped to a character within the first image from a mobile terminal through a wireless communication connection; displaying the received first image; and displaying the mapped information at a location adjacent the character in the first image when the character displayed in the first image is selected.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

Also, the embodiments described herein can be applied to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of any one embodiment may be combined with the features of remaining embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A digital picture frame comprising:
   a wireless communication unit to establish a connection with an external mobile terminal, the wireless communication unit to receive a first image including at least one character and information mapped to the character from the mobile terminal, wherein the information mapped to the character includes contact information relevant to the character and display position information of the character within the first image;
   a touchscreen to display the first image including the at least one character received through the wireless communication unit; and
   a controller to display the mapped information at a location on the touchscreen adjacent the character in the displayed first image when a region that includes the character is selected, wherein when the character displayed on the touchscreen is touched:
   the controller obtains a display position of the character based on the display position information received from the mobile terminal, and
   the controller displays the mapped information at a location that is based on the display position,
   wherein when a touch gesture is inputted on a touchscreen of the external mobile terminal, the wireless communication unit establishes the connection with the external mobile terminal, and the touch gesture including touch movement in at least two directions on the touchscreen of the external mobile terminal,
   wherein when a second image different from the first image is not received for a predetermined duration from the external mobile terminal via the wireless communication unit, the controller to change a screen brightness of the touchscreen to a level below a predetermined brightness level, and
   wherein after the screen brightness of the touchscreen has been changed and when the second image different from the first image is received from the external mobile terminal via the wireless communication unit, the controller to recover the changed screen brightness of the touchscreen to an initial brightness.

2. The digital picture frame of claim 1, wherein the controller transmits a signal indicating selection of mapped information displayed at a location on the touchscreen adjacent the character in the displayed first image.

3. A method of controlling a digital picture frame, comprising:
   when a touch gesture is inputted on a touchscreen of an external mobile terminal, establishing a wireless communication connection with the external mobile terminal, and the touch gesture including touch movement in at least two directions on the touchscreen of the external mobile terminal;
   receiving a first image and information mapped to a character within the first image from the external mobile terminal;
   displaying the received first image; and
   displaying the mapped information at a location adjacent the character in the first image in response to selection of the character displayed in the first image,
   wherein when a second image different from the first image is not received for a predetermined duration from the external mobile terminal, changing a screen brightness of the digital picture frame to a level below a predetermined brightness level, and
   wherein after the screen brightness of the digital picture frame has been changed and when the second image different from the first image is received from the external mobile terminal, recovering the changed screen brightness of the digital picture frame to an initial brightness.

* * * * *